(12) United States Patent
Kotani et al.

(10) Patent No.: US 8,020,395 B2
(45) Date of Patent: Sep. 20, 2011

(54) AIR CONDITIONING APPARATUS

(75) Inventors: Takuya Kotani, Sakai (JP); Kikuji Hori, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 467 days.

(21) Appl. No.: 12/278,078

(22) PCT Filed: Feb. 14, 2007

(86) PCT No.: PCT/JP2007/052573
§ 371 (c)(1),
(2), (4) Date: Aug. 1, 2008

(87) PCT Pub. No.: WO2007/094343
PCT Pub. Date: Aug. 23, 2007

(65) Prior Publication Data
US 2009/0019872 A1    Jan. 22, 2009

(30) Foreign Application Priority Data
Feb. 17, 2006  (JP) .................................. 2006-041212

(51) Int. Cl.
*F25B 41/00* (2006.01)
*F25B 41/04* (2006.01)
(52) U.S. Cl. ............................... 62/225; 62/210; 62/222
(58) Field of Classification Search .............. 62/225, 62/515, 513, 208, 209, 210, 197, 222
See application file for complete search history.

(56) References Cited

U.S. PATENT DOCUMENTS
4,617,804 A    10/1986  Fukushima et al.
2001/0000050 A1 *  3/2001  Okazaki et al. ................ 62/149
2004/0050082 A1    3/2004  So et al.
2004/0134206 A1    7/2004  Lee et al.
2006/0048539 A1    3/2006  Takechi et al.

FOREIGN PATENT DOCUMENTS

| JP | 61-202056 A |   | 9/1986 |
|----|-------------|---|--------|
| JP | 02057875 A  | * | 2/1990 |
| JP | 05322350 A  | * | 12/1993 |
| JP | 07269977 A  | * | 10/1995 |
| JP | 11-037576 A |   | 2/1999 |
| JP | 11-159893 A |   | 6/1999 |
| JP | 11325638 A  | * | 11/1999 |
| JP | 2002-349974 A |  | 12/2002 |
| JP | 2005-069566 A |  | 3/2005 |

OTHER PUBLICATIONS

European Search Report of corresponding EP Application No. 07 70 8375-6 dated Jan. 25, 2011.

* cited by examiner

*Primary Examiner* — Chen-Wen Jiang
(74) *Attorney, Agent, or Firm* — Global IP Counselors

(57) ABSTRACT

An air conditioning apparatus includes a refrigerant circuit and an operation control section. The operation control section is capable of performing a refrigeration cycle for causing an outdoor heat exchanger to function as a refrigerant condenser and an indoor heat exchanger to function as a refrigerant evaporator, while performing superheat degree control for controlling the aperture of an indoor expansion valve so that the degree of superheat of the refrigerant at the outlet from the indoor heat exchanger is constant. The operation control section means sets a lower aperture limit for the indoor expansion valve to perform the superheat degree control, and reduces the lower aperture limit when the refrigerant at the outlet from the indoor heat exchanger is detected to be wet.

5 Claims, 9 Drawing Sheets

AIR CONDITIONING APPARATUS

CROSS-REFERENCE TO RELATED APPLICATIONS

This U.S. National stage application claims priority under 35 U.S.C. §119 (a) to Japanese Patent Application No. 2006-041212, filed in Japan on Feb. 17, 2006, the entire contents of which are hereby incorporated herein by reference.

TECHNICAL FIELD

The present invention relates to an air conditioning apparatus, and particularly relates to a separated-type air conditioning apparatus in which the aperture of an expansion valve is controlled so that the degree of superheat of a refrigerant is kept constant at an outlet from an indoor heat exchanger that functions as a refrigerant evaporator.

BACKGROUND ART

Conventionally, there is a so-called separated-type air conditioning apparatus comprising a refrigerant circuit configured by connecting an outdoor unit having a compressor and an outdoor heat exchanger, and an indoor unit having an expansion valve and an indoor heat exchanger.

In this type of air conditioning apparatus, the performance of the indoor unit is regulated according to the indoor temperature setting and other conditions during a refrigeration cycle such as cooling or dehumidifying in which the outdoor heat exchanger is made to function as a refrigerant condenser, and the indoor heat exchanger is made to function as a refrigerant evaporator. The performance of the indoor unit is regulated mainly by controlling the flow rate of refrigerant flowing through the indoor heat exchanger which functions as a refrigerant evaporator, and a method for controlling the aperture of the expansion valve (hereinafter referred to as superheat degree control) so that the degree of superheat of the refrigerant remains constant at the outlet from the indoor heat exchanger functioning as a refrigerant evaporator is sometimes used as the method for controlling the flow rate of refrigerant flowing through the indoor heat exchanger.

In a separated-type air conditioning apparatus, the indoor unit and the outdoor unit are mounted at positions of different height. The mounting conditions of the indoor unit and outdoor unit are such that when the refrigeration cycle is performed in which the indoor heat exchanger is made to function as a refrigerant evaporator, the pressure of the refrigerant supplied to the indoor unit (hereinafter referred to as indoor unit supply pressure) becomes greater or less than the pressure of the refrigerant in the outdoor heat exchanger (hereinafter referred to as condensation pressure) functioning as a refrigerant condenser in accordance with the height difference between the mounting positions of the outdoor unit and indoor unit. Therefore, in cases in which, e.g., the indoor unit is mounted higher than the outdoor unit and the indoor unit supply pressure is less than the condensation pressure, the performance of the indoor unit is insufficient; i.e., the amount of refrigerant flowing through the indoor heat exchanger functioning as a refrigerant evaporator is insufficient. In cases in which the indoor unit is mounted lower than the outdoor unit and the indoor unit supply pressure is greater than the condensation pressure, instead of the performance of the indoor unit being insufficient, the indoor unit supply pressure sometimes increases undesirably and the COP decreases.

To overcome these problems, there is a method for a separated-type air conditioning apparatus whereby refrigerant can be supplied to the indoor unit at the optimal indoor unit supply pressure by setting a target value for the condensation pressure in accordance with the height difference between the mounting positions of the outdoor unit and the indoor unit, as shown in Japanese Laid-open Patent Application No. 2002-349974.

SUMMARY OF THE INVENTION

However, since the condensation pressure highly depends on the outdoor air, water, or other such conditions used as a heat source for the outdoor heat exchanger, in any case in which the method in Japanese Laid-open Patent Application No. 2002-349974 described above is used, it is not necessarily possible to set and achieve a target condensation pressure in accordance with the height difference between the mounting positions of the outdoor unit and indoor unit. For example, in cases in which the indoor unit is mounted lower than the outdoor unit and the height difference is extremely large, a low target condensation pressure will be set, but the condensation pressure cannot be reduced to the target value depending on the condition of the heat source, such as in cases in which the outdoor air, water, or the like as the heat source is high in temperature. As a result, a situation arises in which the refrigerant can only be supplied to the indoor unit at a higher pressure than the optimal indoor unit supply pressure.

In cases in which a plurality of indoor units is connected to the outdoor unit, there are cases in which there is a height difference between the mounting positions of the indoor units. When the method described above is used in such cases, the target condensation pressure is set to a value that can ensure the supply of refrigerant to the highest mounted indoor unit of the plurality of indoor units. However, the height difference between the highest mounted indoor unit and the lower mounted indoor units is not taken into account, and as a result, the indoor units mounted at positions lower than the highest mounted indoor unit are supplied with refrigerant at a higher pressure than the pressure of the refrigerant supplied to the highest mounted indoor unit, in accordance with the height difference with the highest mounted indoor unit.

In cases in which superheat degree control by an expansion valve is used as the method for regulating the performance of the indoor unit as described above, the condensation pressure is increased by the conditions of the heat source and the height difference between the mounting positions of the outdoor unit and indoor unit, whereby superheat degree control is performed in a state in which the aperture of the expansion valve is extremely small when there is a large pressure difference before and behind the expansion valve in cases in which the indoor unit supply pressure is high. In cases in which superheat degree control by the expansion valve is used as the method for regulating the performance of the indoor units, and the height difference between the mounting positions of the indoor units causes high pressure in the refrigerant supplied to the indoor units mounted at lower positions than the highest mounted indoor unit of the plurality of indoor units as described above, superheat degree control is performed in a state in which the apertures of the expansion valves of the lower mounted indoor units are extremely small because of the large pressure difference before and behind the expansion valves. In cases in which the expansion valve of the highest mounted indoor unit of the plurality of indoor units is kept at a comparatively small aperture, superheat degree control is performed in a state in which the apertures of the expansion valves of the lower mounted indoor units are extremely small due to their relationship with the aperture of the expansion valve of the highest mounted indoor unit, even though the pressure difference before and behind the expansion valve of the highest mounted indoor unit is only moderately high. In cases in which superheat degree control is thus performed in a state in which the apertures of the expansion valves are extremely small, the expansion valves may sometimes become fully closed. However, when the expansion valves become fully closed, the refrigerant can no longer flow through the indoor heat exchangers, the degree of superheat at the outlets from the indoor heat exchangers functioning as refrigerant evaporators can therefore no longer be accurately sensed, the degree of superheat is mistakenly sensed to be apparently constant, and the degree of superheat is also mistakenly sensed to be less than the target value. As a result, a situation arises in which control is not possible while the expansion valves are fully closed, and the degree of superheat of the refrigerant at the outlets from the indoor heat exchangers functioning as evaporators cannot be satisfactorily controlled.

An object of the present invention is to provide a separated-type air conditioning apparatus for controlling the degree of superheat at the outlet from an indoor heat exchanger functioning as an evaporator by the use of an expansion valve, wherein the degree of superheat of the refrigerant at the outlet from the indoor heat exchanger functioning as an evaporator can be satisfactorily controlled in cases in which there is a large height difference between the mounting positions of the outdoor unit and the indoor unit, or in cases in which there is a height difference between the mounting positions of the indoor units when a plurality of indoor units is mounted.

The air conditioning apparatus according to a first aspect comprises a refrigerant circuit and an operation control section or means. The refrigerant circuit is configured by connecting an outdoor unit having a compressor and an outdoor heat exchanger, and an indoor unit having an expansion valve and an indoor heat exchanger. The operation control means is capable of performing a refrigeration cycle for causing the outdoor heat exchanger to function as a refrigerant condenser and the indoor heat exchanger to function as a refrigerant evaporator, while performing superheat degree control for controlling the aperture of the expansion valve so that the degree of superheat of the refrigerant at the outlet from the indoor heat exchanger is constant. The operation control means sets a lower aperture limit for the expansion valve to perform the superheat degree control, and reduces the lower aperture limit when the refrigerant at the outlet from the indoor heat exchanger is detected to be wet.

In this air conditioning apparatus, setting a lower aperture limit for the expansion valve when superheat degree control is performed makes it possible to prevent the expansion valve from fully closing even in cases in which there is a large pressure difference before and behind the expansion valve, such as when there is a large height difference between the mounting positions of the outdoor unit and the indoor unit, or when a plurality of indoor units is mounted and there is a height difference between the mounting positions of the indoor units, and even in cases in which the plurality of indoor units is mounted so as to have a height difference between the mounting positions of the indoor units, and the apertures of the expansion valves of the lower mounted indoor units are extremely small, such as when the pressure difference before and behind the expansion valves is moderately high, but the expansion valve of the highest mounted indoor unit of the plurality of indoor units is kept at a comparatively small aperture. Moreover, reducing the lower aperture limit when the refrigerant at the outlet from the indoor heat exchanger is detected to be wet makes it possible to allow the expansion valve to further move to a range of small apertures while preventing the expansion valve from fully closing. Therefore, it is possible to satisfactorily control the degree of superheat of the refrigerant at the outlet from the indoor heat exchanger functioning as an evaporator even in cases in which the pressure difference before and behind the expansion valve is too great, or in cases in which the aperture of the expansion valve of the lower mounted indoor unit tends to be small in its relationship with the aperture of the expansion valve of the higher mounted indoor unit; e.g., in cases in which an amount of refrigerant in excess of the performance required in the indoor unit flows through the indoor heat exchanger at the initially set lower aperture limit and it becomes difficult to keep the degree of superheat of the refrigerant constant at the outlet from the indoor heat exchanger functioning as an evaporator. The term "lower aperture limit" refers to an aperture of the expansion valve larger than 0%, if the fully closed aperture is expressed as 0% and the fully open aperture is expressed as 100%, wherein the aperture range in which the expansion valve can be moved is limited to this aperture or greater.

The air conditioning apparatus according to a second aspect is the air conditioning apparatus according to the first aspect, wherein the operation control means detects whether or not the refrigerant at the outlet from the indoor heat exchanger is wet on the basis of the degree of superheat of the refrigerant on the intake side of the compressor.

In this air conditioning apparatus, since it is detected whether or not the refrigerant at the outlet from the indoor heat exchanger is wet on the basis of the degree of superheat of the refrigerant on the intake side of the compressor, this detection can also double as protection against wet compression in the compressor.

The air conditioning apparatus according to a third aspect is the air conditioning apparatus according to the first aspect, wherein the operation control means detects whether or not the refrigerant at the outlet from the indoor heat exchanger is wet on the basis of the degree of superheat of the refrigerant on the discharge side of the compressor.

In this air conditioning apparatus, since it is detected whether or not the refrigerant at the outlet from the indoor heat exchanger is wet on the basis of the degree of superheat of the refrigerant on the discharge side of the compressor, this detection can also double as protection against wet compression in the compressor.

The air conditioning apparatus according to a fourth aspect is the air conditioning apparatus according to the first aspect, wherein the operation control means detects whether or not the refrigerant at the outlet from the indoor heat exchanger is wet on the basis of the degree of superheat of the refrigerant at the outlet from the indoor heat exchanger.

In this air conditioning apparatus, since it is detected whether or not the refrigerant at the outlet from the indoor heat exchanger is wet on the basis of the degree of superheat of the refrigerant at the outlet from the indoor heat exchanger, in cases in which a plurality of indoor units is mounted, it is possible to specify the indoor unit in which the refrigerant is wet at the outlet from the indoor heat exchanger, and furthermore, to reduce the lower aperture limit only for the expansion valve of the indoor unit for which the refrigerant at the outlet from the indoor heat exchanger is detected to be wet.

The air conditioning apparatus according to a fifth aspect is the air conditioning apparatus according to the first aspect, wherein the operation control means detects whether or not the refrigerant at the outlet from the indoor heat exchanger is wet on the basis of the aperture of the expansion valve.

In this air conditioning apparatus, since it is detected whether or not the refrigerant at the outlet from the indoor heat exchanger is wet on the basis of the aperture of the expansion valve, in cases in which a plurality of indoor units is mounted, it is possible to specify the indoor unit in which the refrigerant is wet at the outlet from the indoor heat exchanger, and furthermore, to reduce the lower aperture limit only for the expansion valve of the indoor unit for which the refrigerant at the outlet from the indoor heat exchanger is detected to be wet.

DETAILED DESCRIPTION OF THE INVENTION

Embodiments of the air conditioning apparatus according to the present invention are described hereinbelow with reference to the drawings.

First Embodiment (1) Configuration of Air Conditioning Apparatus

Figure 1:
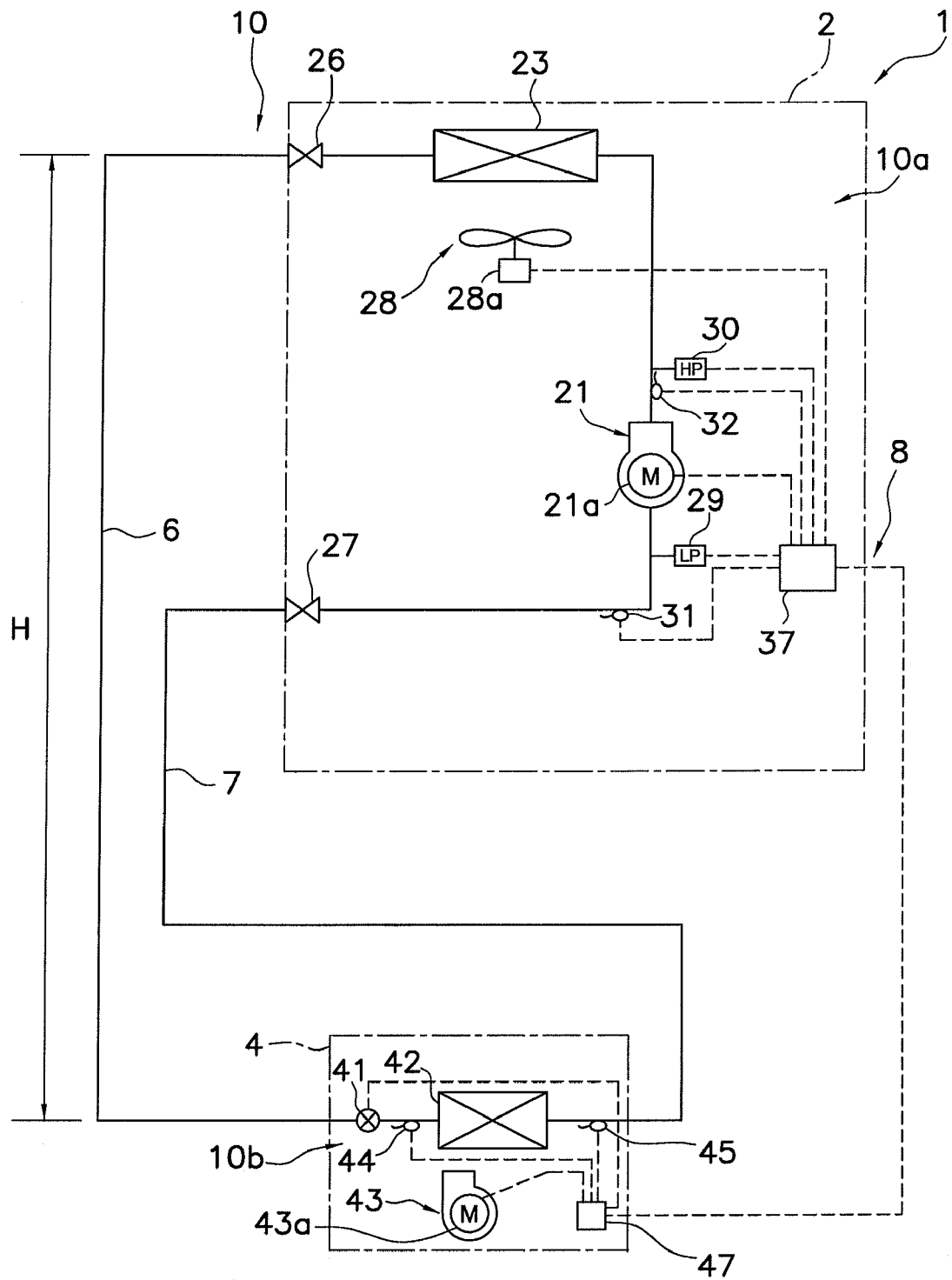
FIG. 1 is a schematic structural diagram of the air conditioning apparatus according to the first embodiment of the present invention.

FIG. 1 is a schematic structural diagram of an air conditioning apparatus 1 according to the first embodiment of the present invention. The air conditioning apparatus 1 is an apparatus used to cool the interior of a building or the like by performing a vapor compression refrigeration cycle. The air conditioning apparatus 1 mainly comprises one outdoor unit 2, one indoor unit 4, and a liquid refrigerant communication pipe 6 and gas refrigerant communication pipe 7 as refrigerant communication pipes for connecting the outdoor unit 2 and the indoor unit 4. Specifically, a vapor compression refrigerant circuit 10 of the air conditioning apparatus 1 of the present embodiment is configured by connecting the outdoor unit 2, the indoor unit 4, the liquid refrigerant communication pipe 6, and the gas refrigerant communication pipe 7. In the present embodiment, the outdoor unit 2 is mounted on the roof of a building or the like, and the indoor unit 4 is mounted lower than the outdoor unit 2 and inside the building (the height difference between the outdoor unit 2 and the indoor unit 4 is referred to as the height difference H).

(Indoor Unit)

The indoor unit 4 is connected to the outdoor unit 2 via the liquid refrigerant communication pipe 6 and the gas refrigerant communication pipe 7, and constitutes part of the refrigerant circuit 10.

Next, the configuration of the indoor unit 4 will be described. The indoor unit 4 mainly has an indoor-side refrigerant circuit 10b constituting part of the refrigerant circuit 10. This indoor-side refrigerant circuit 10b mainly has an indoor expansion valve 41 and an indoor heat exchanger 42.

In the present embodiment, the indoor expansion valve 41 is an electric expansion valve connected to the liquid side of the indoor heat exchanger 42 in order to regulate the flow rate or the like of refrigerant flowing through the indoor-side refrigerant circuit 10b.

In the present embodiment, the indoor heat exchanger 42 is a cross-fin type fin-and-tube heat exchanger configured by a heat transfer pipe and a large number of fins, and is also a heat exchanger that functions as a refrigerant evaporator and cools indoor air.

In the present embodiment, the indoor unit 4 has an indoor fan 43 as a blowing fan for drawing indoor air into the unit and for supplying air into the room after heat has been exchanged between the air and the refrigerant in the indoor heat exchanger 42. The indoor fan 43 is a centrifugal fan, a multi-blade fan, or the like driven by a motor 43a.

The indoor unit 4 is provided with various sensors. A liquid-side temperature sensor 44 for sensing the refrigerant temperature Ti in the inlet of the indoor heat exchanger 42 is provided to the liquid-side of the indoor heat exchanger 42. A gas-side temperature sensor 45 for sensing the refrigerant temperature To at the outlet from the indoor heat exchanger 42 is provided to the gas side of the indoor heat exchanger 42. In the present embodiment, the liquid-side temperature sensor 44 and the gas-side temperature sensor 45 are composed of thermistors. The indoor unit 4 also has an indoor-side control unit 47 for controlling the operations of the components constituting the indoor unit 4. The indoor-side control unit 47 has a microcomputer, memory, or the like provided for controlling the indoor unit 4, and is designed to be capable of exchanging control signals and the like with a remote controller (not shown) for operating the indoor unit 4, and also to be capable of exchanging control signals and the like with the outdoor unit 2.

(Outdoor Unit)

The outdoor unit 2 is connected to the indoor unit 4 via the liquid refrigerant communication pipe 6 and the gas refrigerant communication pipe 7, and the refrigerant circuit 10 is configured between the outdoor unit 2 and the indoor unit 4.

Next, the configuration of the outdoor unit 2 will be described. The outdoor unit 2 mainly has an outdoor-side refrigerant circuit 10a constituting part of the refrigerant circuit 10. This outdoor-side refrigerant circuit 10a mainly has a compressor 21, an outdoor heat exchanger 23, a liquid-side shut-off valve 26, and a gas-side shut-off valve 27.

The compressor 21 is a hermatic compressor driven by a motor 21a in the present embodiment. There is only one compressor 21 in the present embodiment, but the present invention is not limited to this option alone, and two or more compressors may be connected in parallel according to the number of connected indoor units and other conditions.

In the present embodiment, the outdoor heat exchanger 23 is a cross-fin type fin-and-tube heat exchanger configured by a heat transfer tube and a large number of fins, and is also a heat exchanger that functions as a refrigerant condenser. The gas side of the outdoor heat exchanger 23 is connected to the discharge side of the compressor 21, and the liquid side is connected to the liquid-side shut-off valve 26.

In the present embodiment, the outdoor unit 2 has an outdoor fan 28 as a blowing fan for drawing outdoor air into the unit and for expelling the air to the outdoors after heat has been exchanged between the air and the refrigerant in the outdoor heat exchanger 23. This outdoor fan 28 is a propeller fan or the like driven by a motor 28a.

The liquid-side shut-off valve 26 and the gas-side shut-off valve 27 are valves provided to the ports connecting with external devices and pipes (specifically, with the liquid refrigerant communication pipe 6 and the gas refrigerant communication pipe 7). The liquid-side shut-off valve 26 is connected to the outdoor heat exchanger 23. The gas-side shut-off valve 27 is connected to the intake side of the compressor 21.

The outdoor unit 2 is provided with various sensors. Specifically, the outdoor unit 2 is provided with an intake pressure sensor 29 for sensing the intake pressure Ps of the compressor 21, a discharge pressure sensor 30 for sensing the discharge pressure Pd of the compressor 21, an intake temperature sensor 31 for sensing the intake temperature Ts of the compressor 21, and a discharge temperature sensor 32 for sensing the discharge temperature Td of the compressor 21. The intake temperature sensor 31 and the discharge temperature sensor 32 are composed of thermistors in the present embodiment. The outdoor unit 2 has an outdoor-side control unit 37 for controlling the operations of the components constituting the outdoor unit 2. The outdoor-side control unit 37 has a microcomputer, memory, or the like provided for controlling the outdoor unit 2, and is designed to be capable of exchanging control signals and the like with the indoor-side control unit 47 of the indoor unit 4. Specifically, a control unit 8 acts as an operation control section or means to control (for controlling) the operation of the air conditioning apparatus 1. The control unit 8 includes the indoor-side control unit 47 and the outdoor-side control unit 37.

Figure 2:
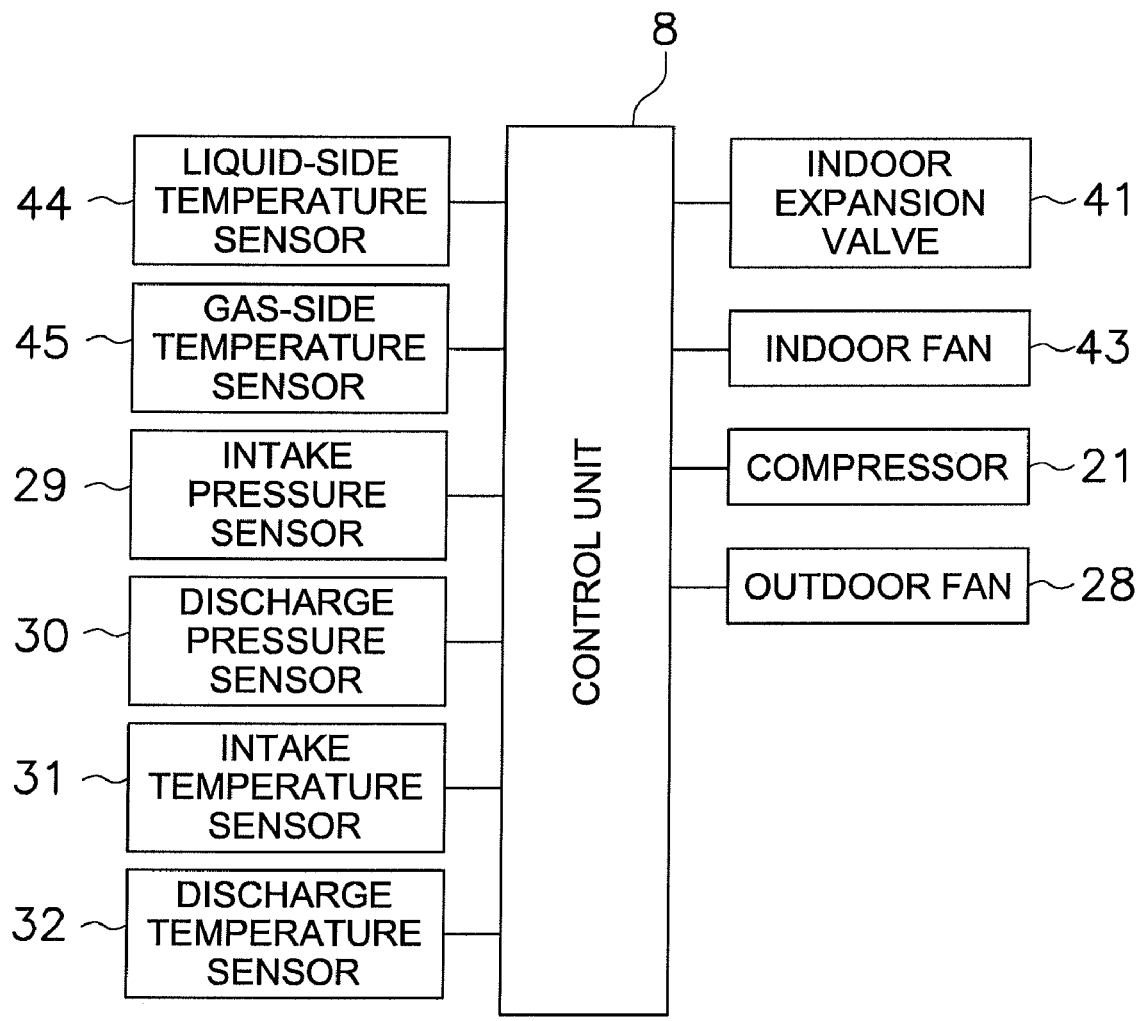
FIG. 2 is a control block diagram of the air conditioning apparatus according to the first embodiment of the present invention.

The control unit 8 is connected so as to be capable of receiving sensor signals from the various sensors 29 through 32, 44, and 45, and is also connected to be capable of controlling the various devices and valves 21, 28, 41, and 43 on the basis of these sensor signals and the like, as shown in FIG. 2. FIG. 2 is a control block diagram of the air conditioning apparatus 1 according to the present embodiment.

(Refrigerant Communication Pipes)

The refrigerant communication pipes 6, 7 are refrigerant pipes that are plumbed on the site when the air conditioning apparatus 1 is mounted in a building or other mounting site.

As described above, the indoor-side refrigerant circuit 10b, the outdoor-side refrigerant circuit 10a, and the refrigerant communication pipes 6, 7 are connected to form the refrigerant circuit 10 of the air conditioning apparatus 1. The air conditioning apparatus 1 of the present embodiment is designed so that the control unit 8 configured from the indoor-side control unit 47 and outdoor-side control unit 37 controls the devices of the outdoor unit 2 and the indoor unit 4 in accordance with the indoor temperature settings and other conditions, while performing a refrigeration cycle such as cooling or dehumidification in which the outdoor heat exchanger 23 is made to function as a refrigerant condenser, and the indoor heat exchanger 42 is made to function as a refrigerant evaporator.

(2) Operation of Air Conditioning Apparatus

Next, the operation of the air conditioning apparatus 1 of the present embodiment will be described.

(Cooling Operation/Dehumidifying Operation)

First, the liquid-side shut-off valve 26 and the gas-side shut-off valve 27 are fully open, and when an operation command for cooling or dehumidifying is sent from the remote controller or the like, the motor 21a of the compressor 21, the motor 28a of the outdoor fan 28, and the motor 43a of the indoor fan 43 start up. A low-pressure gas refrigerant is then drawn into the compressor 21 and compressed into a high-pressure gas refrigerant. The high-pressure gas refrigerant is then sent to the outdoor heat exchanger 23, where heat exchange is performed with outdoor air supplied by the outdoor fan 28, and the refrigerant is condensed into a high-pressure liquid refrigerant. This high-pressure liquid refrigerant is sent to the indoor unit 4 via the liquid-side shut-off valve 26 and the liquid refrigerant communication pipe 6. The high-pressure liquid refrigerant sent to the indoor unit 4 is reduced in pressure down to approximately the intake pressure Ps of the compressor 21 by the indoor expansion valve 41 to form a low-pressure gas-liquid two-phase refrigerant, which is then sent to the indoor heat exchanger 42. Heat exchange is performed with indoor air in the indoor heat exchanger 42, and the refrigerant is evaporated into a low-pressure gas refrigerant. This low-pressure gas refrigerant is sent to the outdoor unit 2 via the gas refrigerant communication pipe 7, and is then again drawn into the compressor 21 via the gas-side shut-off valve 27.

(Superheat Degree Control)

Figure 3:
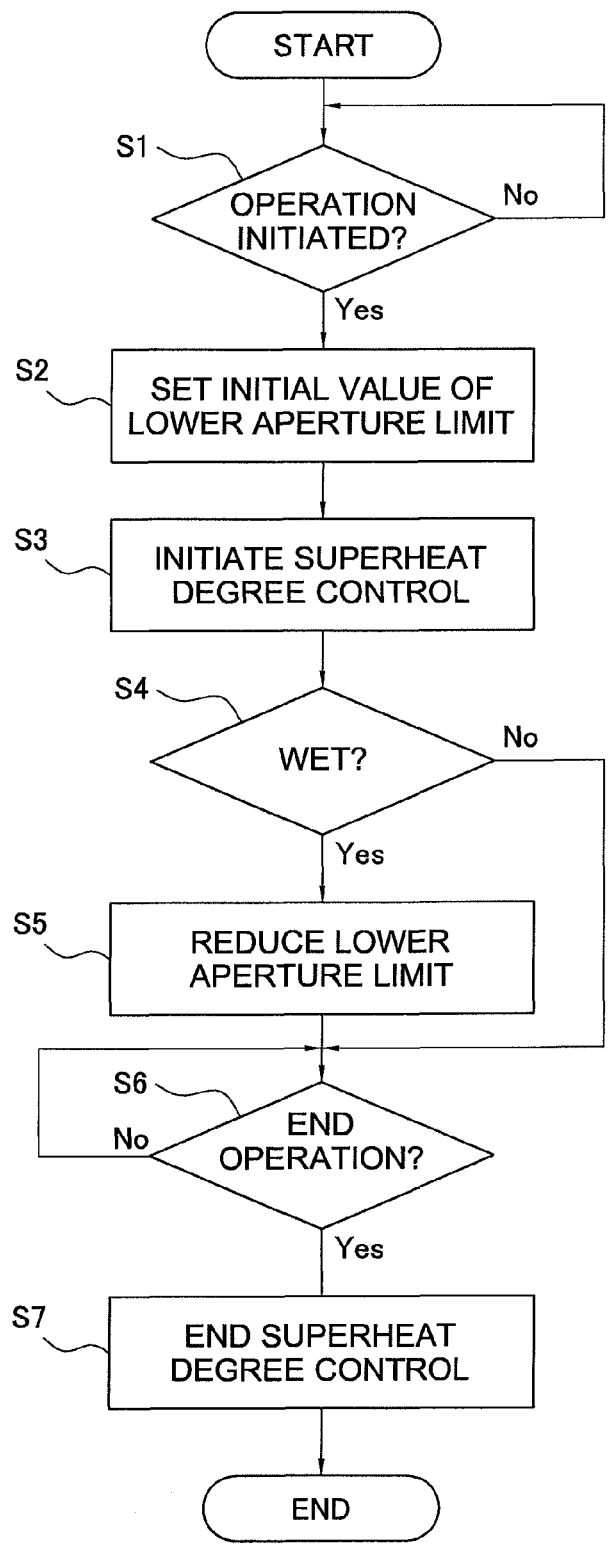
FIG. 3 is a flowchart showing the specifics of superheat degree control according to the first and second embodiments of the present invention.

In the refrigeration cycle described above, in which the outdoor heat exchanger 23 is made to function as a refrigerant condenser and the indoor heat exchanger 42 is made to function as a refrigerant evaporator, superheat degree control is performed in which the aperture MV of the indoor expansion valve 41 is controlled so that the degree of superheat SHr of the refrigerant is kept constant at the target degree of superheat SHrs at the outlet from the indoor heat exchanger 42 (i.e., in the gas side of the indoor heat exchanger 42) that functions as a refrigerant evaporator. Next, the superheat degree control by the use of the indoor expansion valve 41 will be described using FIG. 3. FIG. 3 is a flowchart showing the specifics of the superheat degree control of the present embodiment.

First, when it is determined in step S1 that the operation of the air conditioning apparatus 1 has been initiated by an operation command or the like from the remote controller, in step S2, a lower aperture limit of the indoor expansion valve 41 for superheat degree control by the indoor expansion valve 41 is set to an initial value MV0. The purpose of setting the lower aperture limit of the indoor expansion valve 41 is to prevent the indoor expansion valve 41 from fully closing during superheat degree control in cases in which there is a large pressure difference before and behind the indoor expansion valve 41, such as in cases in which there is an extremely large height difference H between the mounting positions of the outdoor unit 2 and the indoor unit 4, or cases in which the height difference H between the mounting positions of the outdoor unit 2 and the indoor unit 4 is moderately high but the condensation pressure is comparatively high due to conditions in the heat source of the outdoor heat exchanger 23. The term "lower aperture limit" refers to an aperture of the indoor expansion valve 41 larger than 0%, if the fully closed aperture is expressed as 0% and the fully open aperture is expressed as 100%, wherein the aperture range in which the indoor expansion valve 41 can be moved is limited to this aperture or greater.

Next, in step S3, superheat degree control is initiated, wherein the aperture MV of the indoor expansion valve 41 is controlled so that the degree of superheat SHr of the refrigerant at the outlet from the indoor heat exchanger 42 is kept constant at a preset target degree of superheat SHrs. The indoor expansion valve 41 is in a state in which the lower aperture limit is limited to the initial value MV0, and the aperture MV of the indoor expansion valve 41 can therefore be varied between MV0 and the fully open aperture so that the degree of superheat SHr of the refrigerant at the outlet from the indoor heat exchanger 42 is kept constant at the target degree of superheat SHrs. The degree of superheat SHr of the refrigerant at the outlet from the indoor heat exchanger 42 is obtained by subtracting the refrigerant temperature Ti sensed by the liquid-side temperature sensor 44 from the refrigerant temperature To sensed by the gas-side temperature sensor 45. Though not used in the present embodiment, another possibility is to obtain the degree of superheat SHr of the refrigerant at the outlet from the indoor heat exchanger 42 by providing a temperature sensor for sensing the temperature of the refrigerant flowing through the indoor heat exchanger 42, and subtracting the refrigerant temperature sensed by this temperature sensor from the refrigerant temperature To sensed by the gas-side temperature sensor 45.

Next, in step S4, a determination is made as to whether or not the refrigerant at the outlet from the indoor heat exchanger 42 is wet. In the present embodiment, the determination of whether or not the refrigerant at the outlet from the indoor heat exchanger 42 is wet is made based on the degree of superheat SHi of the refrigerant on the intake side of the compressor 21. Specifically, in cases in which the refrigerant at the outlet from the indoor heat exchanger 42 is wet, the refrigerant on the intake side of the compressor 21 located downstream of the indoor heat exchanger 42 is also in a nearly wet state, and this phenomenon is therefore used to determine whether or not the refrigerant at the outlet from the indoor heat exchanger 42 is wet. More specifically, the refrigerant at the outlet from the indoor heat exchanger 42 is determined to be wet in cases in which the degree of superheat SHi of the refrigerant on the intake side of the compressor 21 is smaller than a specific value (for example, in cases in which the degree of superheat SHi is equal to or less than 0 degrees). The degree of superheat SHi of the refrigerant on the intake side of the compressor 21 used in the determination of whether or not the refrigerant at the outlet from the indoor heat exchanger 42 is wet is obtained by converting the intake pressure Ps sensed by the intake pressure sensor 29 to a saturation temperature of the refrigerant, and subtracting this saturation temperature from the intake temperature Ts sensed by the intake temperature sensor 31.

In step S4, when it is determined that the refrigerant at the outlet from the indoor heat exchanger 42 is not wet, it can be determined that the condition of the height difference H allows the degree of superheat SHr to be kept constant at the target degree of superheat SHrs even if the lower aperture limit of the indoor expansion valve 41 is set to the initial value MV0. Therefore, in steps S6 and S7, until the operation of the air conditioning apparatus 1 is ended by an operation end command or the like from the remote controller, superheat degree control by the indoor expansion valve 41 is performed in a state in which the lower aperture limit of the indoor expansion valve 41 is set to the initial value MV0.

When it is determined in step S4 that the refrigerant at the outlet from the indoor heat exchanger 42 is wet, in step S5, the setting of the lower aperture limit of the indoor expansion valve 41 is changed from the initial value MV0 to MV1, which is smaller than the initial value MV0. The reason for reducing the lower aperture limit of the indoor expansion valve 41 is that when the pressure difference before and behind the indoor expansion valve 41 is too large and the lower aperture limit is left at the initial value MV0, an amount of refrigerant in excess of the performance required in the indoor unit 4 flows through the indoor heat exchanger 42, and it becomes difficult to keep the degree of superheat SHr constant at the target degree of superheat SHrs (specifically, the degree of superheat SHr becomes less than the target degree of superheat SHrs). Thus, in step S5, reducing the lower aperture limit of the indoor expansion valve 41 makes it possible to prevent the indoor expansion valve 41 from fully closing while allowing the indoor expansion valve 41 to move within a range of small apertures MV, and also makes it possible to keep the degree of superheat SHr constant at the target degree of superheat SHrs. Therefore, in steps S6 and S7, superheat degree control is performed using the indoor expansion valve 41 in a state in which the lower aperture limit of the indoor expansion valve 41 is set to MV1, which is less than the initial value MV0, until the operation of the air conditioning apparatus 1 is ended by an operation end command or the like from the remote controller.

In step S5, when the lower aperture limit is changed from the initial value MV0 to MV1, a lower aperture limit of the indoor expansion valve 41 suitable for the condition of the height difference H may be stored by substituting MV1 for the initial value MV0 or by another such method. When the air conditioning apparatus 1 is operated again, a lower aperture limit of the indoor expansion valve 41 suitable for the condition of the height difference H is thereby initially set in step S2.

Operation control for the air conditioning apparatus 1, including the superheat degree control described above, is performed by the control unit 8 acting as the operation control section or means.

(3) Characteristics of Air Conditioning Apparatus

The air conditioning apparatus 1 of the present embodiment has the following characteristics.

(A)

In the air conditioning apparatus 1 of the present embodiment, setting a lower aperture limit for the indoor expansion valve 41 (to the initial value MV0 in the present embodiment) when superheat degree control is performed makes it possible to prevent the indoor expansion valve 41 from fully closing even when there is a large pressure difference before and behind the indoor expansion valve 41. This occurs in cases in which the height difference H between the mounting positions of the outdoor unit 2 and indoor unit 4 is extremely large, or in cases in which the height difference H between the mounting positions of the outdoor unit 2 and indoor unit 4 is moderately high but the condensation pressure becomes comparatively high due to the conditions of the heat source of the outdoor heat exchanger 23. Moreover, reducing the lower aperture limit (changing the setting from the initial value MV0 to MV1 in the present embodiment) when the refrigerant at the outlet from the indoor heat exchanger 42 is detected to be wet makes it possible to prevent the indoor expansion valve 41 from fully closing while allowing the indoor expansion valve 41 to be moved to a range of small apertures MV. It therefore becomes possible to satisfactorily control the degree of superheat SHr of the refrigerant at the outlet from the indoor heat exchanger 42 even in cases in which the pressure difference before and behind the indoor expansion valve 41 is too large, in which an amount of refrigerant in excess of the performance required in the indoor unit 4 flows through the indoor heat exchanger 42 at, e.g., the lower aperture limit initially set (the initial value MV0 in the present embodiment), and in which it is difficult to keep constant the degree of superheat SHr of the refrigerant at the outlet from the indoor heat exchanger 42 that functions as an evaporator. In cases in which there is a small height difference H between the mounting positions of the outdoor unit 2 and indoor unit 4, the lower aperture limit is maintained at a large value (the initial value MV0 in the present embodiment), and the moveable range of the aperture MV of the indoor expansion valve 41 is restricted to an appropriate and comparatively small range (from the lower aperture limit MV0 to the fully open aperture in the present embodiment). Therefore, as a result, the superheat degree control by the indoor expansion valve 41 is performed with greater ease.

(B)

In the air conditioning apparatus 1 of the present embodiment, since it is detected whether or not the refrigerant at the outlet from the indoor heat exchanger 42 is wet on the basis of the degree of superheat SHi of the refrigerant on the intake side of the compressor 21 (in the present embodiment, on the basis of whether or not the degree of superheat SHi of the refrigerant on the intake side of the compressor 21 is less than a specific value), this detection can also serve as protection against wet compression in the compressor 21.

(4) Modification 1

Figure 4:
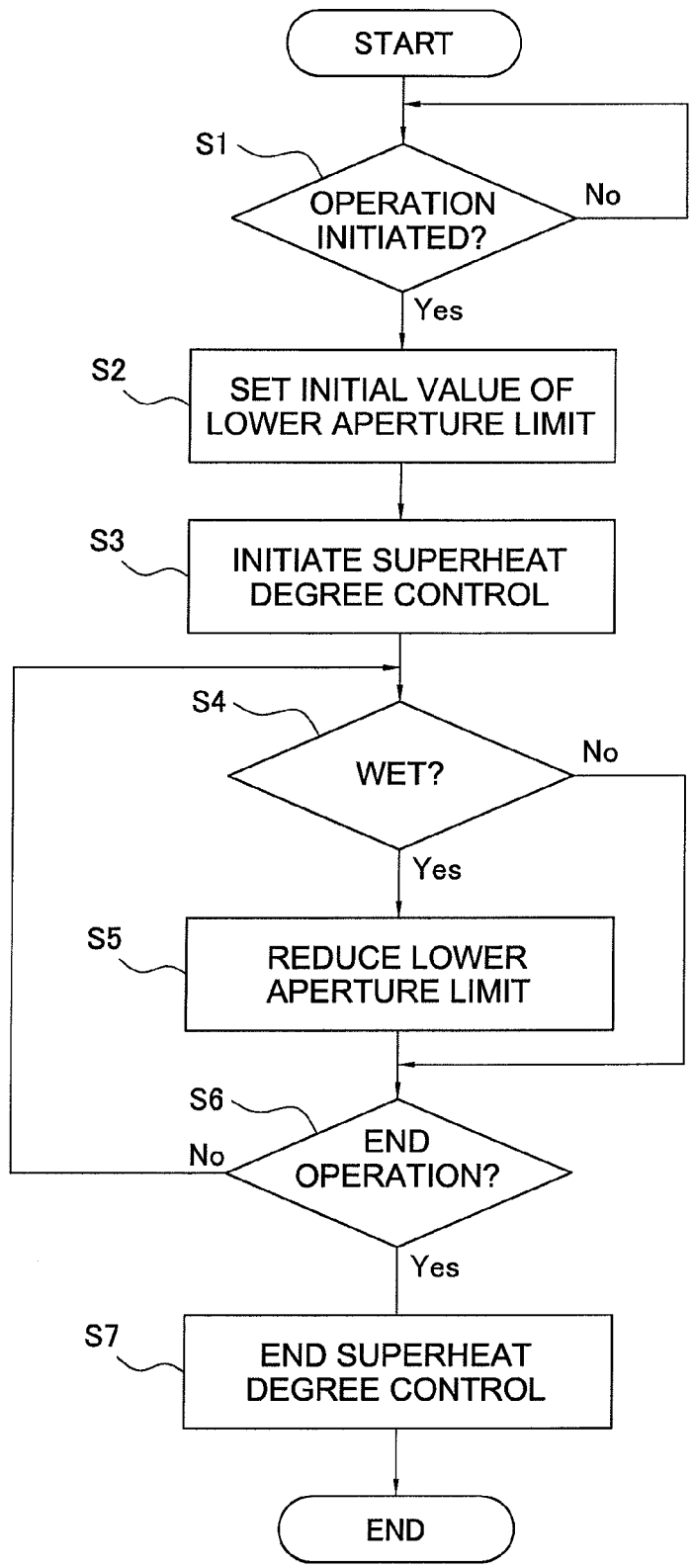
FIG. 4 is a flowchart showing the specifics of superheat degree control according to modification 1 of the first and second embodiments of the present invention.

In the present embodiment described above, in cases in which it is determined in step S4 (see FIG. 3) of superheat degree control that the refrigerant at the outlet from the indoor heat exchanger 42 is wet, the setting of the lower aperture limit of the indoor expansion valve 41 is changed only once from the initial value MV0 to MV1, which is less than MV0. Another possibility, however, as shown in FIG. 4, is to change the setting in step S5 so that the lower aperture limit of the indoor expansion valve 41 decreases intermittently from the initial value MV0 (e.g., MV0→MV1→MV2→ . . . etc.), until it is no longer determined in step S4 that the refrigerant at the outlet from the indoor heat exchanger 42 is wet.

The changing range of the lower aperture limit changed by multiple setting changes can thereby be reduced in comparison with cases in which the lower aperture limit is greatly reduced by one setting change, and it is unlikely that disturbances or the like will occur in controlling the degree of superheat by changing the setting of the lower aperture limit.

(5) Modification 2

In step S4 (see FIGS. 3 and 4) of superheat degree control in the present embodiment and modification 1 described above, it is detected whether or not the refrigerant at the outlet from the indoor heat exchanger 42 is wet on the basis of the degree of superheat SHi of the refrigerant on the intake side of the compressor 21, but another possibility is to detect whether or not the refrigerant at the outlet from the indoor heat exchanger 42 is wet on the basis of the degree of superheat SHo of the refrigerant on the discharge side of the compressor 21 instead of the degree of superheat SHi. Specifically, in cases in which the refrigerant at the outlet from the indoor heat exchanger 42 is wet, wet compression occurs in the compressor 21 located downstream of the indoor heat exchanger 42 to reduce the degree of superheat SHo of the refrigerant on the discharge side of the compressor 21, and this phenomenon can therefore be used to determine whether or not the refrigerant at the outlet from the indoor heat exchanger 42 is wet. More specifically, the refrigerant at the outlet from the indoor heat exchanger 42 is determined to be wet in cases in which the degree of superheat SHo of the refrigerant on the discharge side of the compressor 21 is less than a specific value (for example, cases such as those in which the degree of superheat SHo is equal to or less than 0 degrees). The degree of superheat SHo of the refrigerant on the discharge side of the compressor 21 used to determine whether or not the refrigerant at the outlet from the indoor heat exchanger 42 is wet is obtained by converting the discharge pressure Pd sensed by the discharge pressure sensor 30 to a saturation temperature of the refrigerant, and subtracting this saturation temperature from the discharge temperature Td sensed by the discharge temperature sensor 32.

Similar to the case in which it was detected whether or not the refrigerant at the outlet from the indoor heat exchanger 42 was wet on the basis of the degree of superheat SHi of the refrigerant on the intake side of the compressor 21, it is possible to detect whether or not the refrigerant at the outlet from the indoor heat exchanger 42 is wet, and this detection can also serve as protection against wet compression in the compressor 21.

Another possibility is to use both the degree of superheat SHi and the degree of superheat SHo to determine whether or not the refrigerant at the outlet from the indoor heat exchanger 42 is wet. For example, in cases in which the protection of the compressor 21 is emphasized, the refrigerant at the outlet from the indoor heat exchanger 42 may be determined to be wet when either the degree of superheat SHi or degree of superheat SHo falls to a specific value or less. In cases in which the ease of controlling the degree of superheat of the indoor expansion valve 41 is emphasized, the refrigerant at the outlet from the indoor heat exchanger 42 may be determined to be wet when both the degree of superheat SHi and degree of superheat SHo fall to a specific value or less.

(6) Modification 3

In step S4 (see FIG. 3 or 4) of superheat degree control in the present embodiment and modification 1 described above, it is detected whether or not the refrigerant at the outlet from the indoor heat exchanger 42 is wet on the basis of the degree of superheat SHi of the refrigerant on the intake side of the compressor 21, but another possibility is to detect whether or not the refrigerant at the outlet from the indoor heat exchanger 42 is wet on the basis of the degree of superheat SHr of the refrigerant at the outlet from the indoor heat exchanger 42 instead of the degree of superheat SHi. Specifically, in cases in which the refrigerant at the outlet from the indoor heat exchanger 42 is wet, the degree of superheat SHr of the refrigerant at the outlet from the indoor heat exchanger 42 is small, and this phenomenon can therefore be used to determine whether or not the refrigerant at the outlet from the indoor heat exchanger 42 is wet. More specifically, in cases in which the degree of superheat SHr of the refrigerant at the outlet from the indoor heat exchanger 42 is less than a specific value (for example, cases such as those in which the degree of superheat SHr is equal to or less than 0 degrees), the refrigerant at the outlet from the indoor heat exchanger 42 is determined to be wet.

It is thereby made possible to detect whether or not the refrigerant at the outlet from the indoor heat exchanger 42 is wet in the same manner as in the case in which it is detected whether or not the refrigerant at the outlet from the indoor heat exchanger 42 is wet on the basis of the degree of superheat SHi of the refrigerant on the intake side of the compressor 21.

Another possibility is to use both the degree of superheat SHi and the degree of superheat SHr to determine whether or not the refrigerant at the outlet from the indoor heat exchanger 42 is wet. For example, in cases in which the protection of the compressor 21 is emphasized, the refrigerant at the outlet from the indoor heat exchanger 42 may be determined to be wet when either the degree of superheat SHi or degree of superheat SHr falls to a specific value or less. In cases in which the ease of controlling the degree of superheat of the indoor expansion valve 41 is emphasized, the refrigerant at the outlet from the indoor heat exchanger 42 may be determined to be wet when both the degree of superheat SHi and degree of superheat SHr fall to a specific value or less.

In modification 2 described above, it is detected whether or not the refrigerant at the outlet from the indoor heat exchanger 42 is wet on the basis of the degree of superheat SHo of the refrigerant on the discharge side of the compressor 21, but another possibility is to determine whether or not the refrigerant at the outlet from the indoor heat exchanger 42 is wet by additionally using the degree of superheat SHr, or by using both the degree of superheat SHi and the degree of superheat SHr.

(7) Modification 4

In step S4 (see FIGS. 3 and 4) of superheat degree control in the present embodiment and modification 1 described above, it is detected whether or not the refrigerant at the outlet from the indoor heat exchanger 42 is wet on the basis of the degree of superheat SHi of the refrigerant on the intake side of the compressor 21, but another possibility is to detect whether or not the refrigerant at the outlet from the indoor heat exchanger 42 is wet on the basis of the aperture MV of the indoor expansion valve 41 instead of the degree of superheat SHi. Specifically, in cases in which the refrigerant at the outlet from the indoor heat exchanger 42 is wet, the aperture MV of the indoor expansion valve 41 remains constant at the lower aperture limit, and this phenomenon can therefore be used to determine whether or not the refrigerant at the outlet from the indoor heat exchanger 42 is wet. More specifically, the refrigerant at the outlet from the indoor heat exchanger 42 is determined to be wet in cases in which the aperture MV of the indoor expansion valve 41 is equal to or less than a specific aperture (for example, cases such as those in which a specific time has passed with the aperture MV at the lower aperture limit).

It is thereby made possible to detect whether or not the refrigerant at the outlet from the indoor heat exchanger 42 is wet in the same manner as in the case in which it is detected whether or not the refrigerant at the outlet from the indoor heat exchanger 42 is wet on the basis of the degree of superheat SHi of the refrigerant on the intake side of the compressor 21.

Another possibility is to use both the degree of superheat SHi and the aperture MV to determine whether or not the refrigerant at the outlet from the indoor heat exchanger 42 is wet. For example, in cases in which the protection of the compressor 21 is emphasized, the refrigerant at the outlet from the indoor heat exchanger 42 may be determined to be wet when either the degree of superheat SHi or the aperture MV falls to a specific value or less. In cases in which the ease of controlling the degree of superheat of the indoor expansion valve 41 is emphasized, the refrigerant at the outlet from the indoor heat exchanger 42 may be determined to be wet when both the degree of superheat SHi and the aperture MV fall to a specific value or less.

In modification 2 described above, it is detected whether or not the refrigerant at the outlet from the indoor heat exchanger 42 is wet on the basis of the degree of superheat SHo of the refrigerant on the discharge side of the compressor 21, but another possibility is to determine whether or not the refrigerant at the outlet from the indoor heat exchanger 42 is wet by additionally using the aperture MV, or by using both the degree of superheat SHi and the aperture MV.

In modification 3 described above, it was detected whether or not the refrigerant at the outlet from the indoor heat exchanger 42 was wet on the basis of the degree of superheat SHr of the refrigerant at the outlet from the indoor heat exchanger 42, but another possibility is to determine whether or not the refrigerant at the outlet from the indoor heat exchanger 42 is wet by additionally using the aperture MV, using both the degree of superheat SHi and the aperture MV, using both the degree of superheat SHo and the aperture MV, or using the degree of superheat SHi, the degree of superheat SHo, and the aperture MV all together.

Second Embodiment

Figure 5:
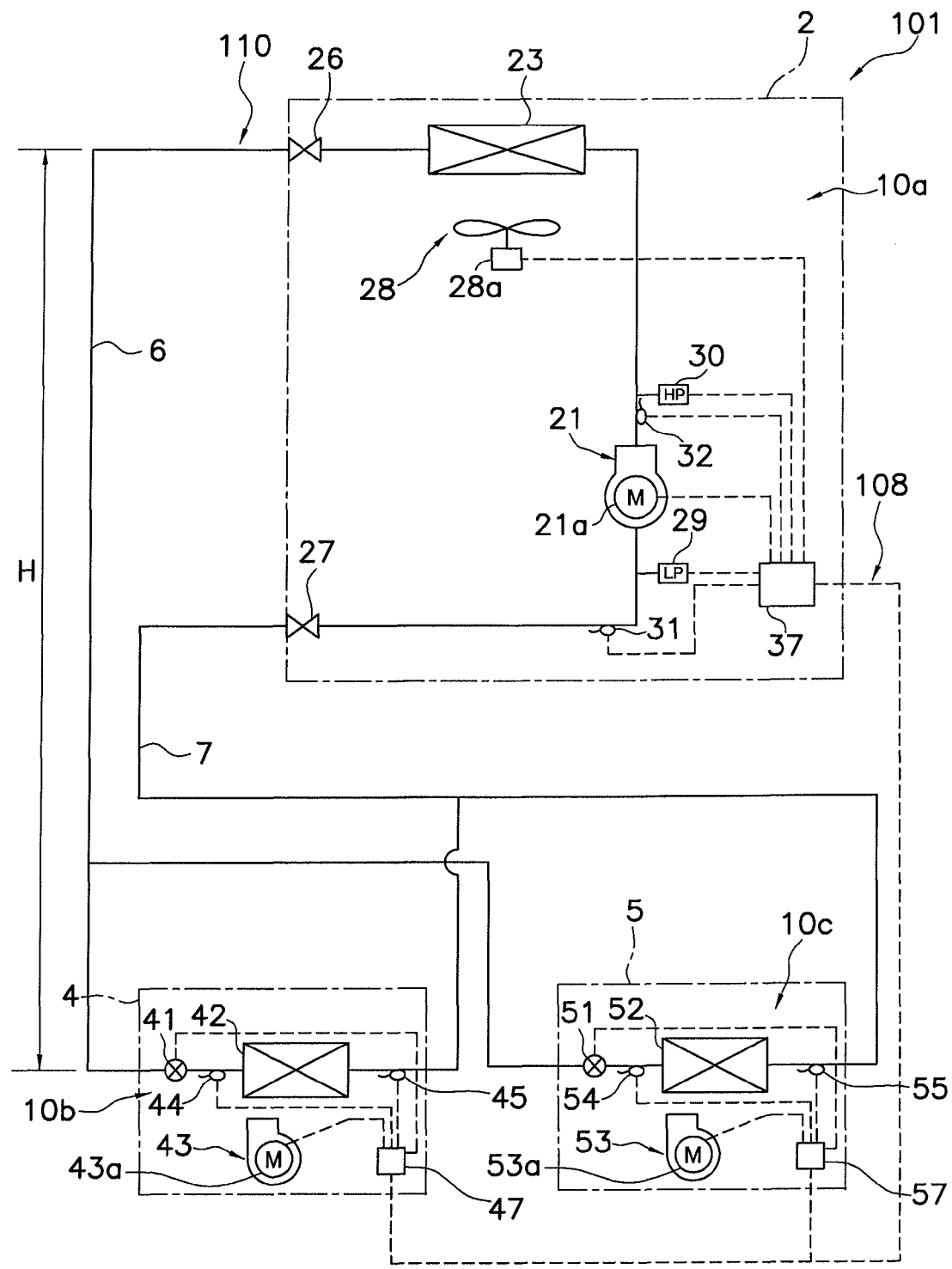
FIG. 5 is a schematic structural diagram of the air conditioning apparatus according to the second embodiment of the present invention.

FIG. 5 is a schematic structural diagram of an air conditioning apparatus 101 according to the second embodiment of the present invention. The air conditioning apparatus 101 is an apparatus used to cool the interior of a building or the like by performing a vapor compression refrigeration cycle. The air conditioning apparatus 101 mainly comprises one outdoor unit 2, two indoor units 4, 5, and a liquid refrigerant communication pipe 6 and gas refrigerant communication pipe 7 as refrigerant communication pipes for connecting the outdoor unit 2 with the indoor units 4, 5. Specifically, a vapor compression refrigerant circuit 110 of the air conditioning apparatus 101 of the present embodiment is configured by connecting the outdoor unit 2, the indoor units 4, 5, the liquid refrigerant communication pipe 6, and the gas refrigerant communication pipe 7. In the present embodiment, the outdoor unit 2 is mounted in a building roof or the like, and the indoor units 4, 5 are mounted indoors at a position lower than the outdoor unit 2. The indoor unit 4 and the indoor unit 5 are mounted at the same height (the height difference between the outdoor unit 2 and the indoor units 4, 5 is referred to as the height difference H).

(Indoor Unit)

The indoor units 4, 5 are connected to the outdoor unit 2 via the liquid refrigerant communication pipe 6 and the gas refrigerant communication pipe 7, constituting part of the refrigerant circuit 110.

Next, the configuration of the indoor unit 4 will be described. The indoor unit 4 mainly has an indoor-side refrigerant circuit 110b constituting part of the refrigerant circuit 110. The indoor-side refrigerant circuit 110b mainly has an indoor expansion valve 41 and an indoor heat exchanger 42. The configuration of the indoor unit 4 is similar to the configuration of the indoor unit 4 in the first embodiment, and is therefore not described.

Next, the configuration of the indoor unit 5 will be described. The indoor unit 5 mainly has an indoor-side refrigerant circuit 110c constituting part of the refrigerant circuit 110. This indoor-side refrigerant circuit 110c mainly has an indoor expansion valve 51 and an indoor heat exchanger 52. Since the configuration of the indoor unit 5 is similar to the configuration of the indoor unit 4, numerical symbols in the forties indicating the parts of the indoor unit 4 are replaced by numerical symbols in the fifties, and these parts are not described.

(Outdoor Unit)

The outdoor unit 2 is connected to the indoor units 4, 5 via the liquid refrigerant communication pipe 6 and the gas refrigerant communication pipe 7, and the refrigerant circuit 110 is configured between the outdoor unit 2 and the indoor units 4, 5.

Next, the configuration of the outdoor unit 2 will be described. The outdoor unit 2 mainly has an outdoor-side refrigerant circuit 10a constituting part of the refrigerant circuit 110. This outdoor-side refrigerant circuit 10a mainly has a compressor 21, an outdoor heat exchanger 23, a liquid-side shut-off valve 26, and a gas-side shut-off valve 27. The configuration of the outdoor unit 2 is similar to the configuration of the outdoor unit 2 in the first embodiment, and is therefore not described.

In the air conditioning apparatus 101 of the present embodiment, an outdoor-side control unit 37 for controlling the outdoor unit 2 is designed to be capable of exchanging control signals and the like with indoor-side control units 47, 57 for controlling the indoor unit 4, and constitutes a control unit 108 acting as an operation control section or means to control (for controlling) the operation of the air conditioning apparatus 101.

Figure 6:
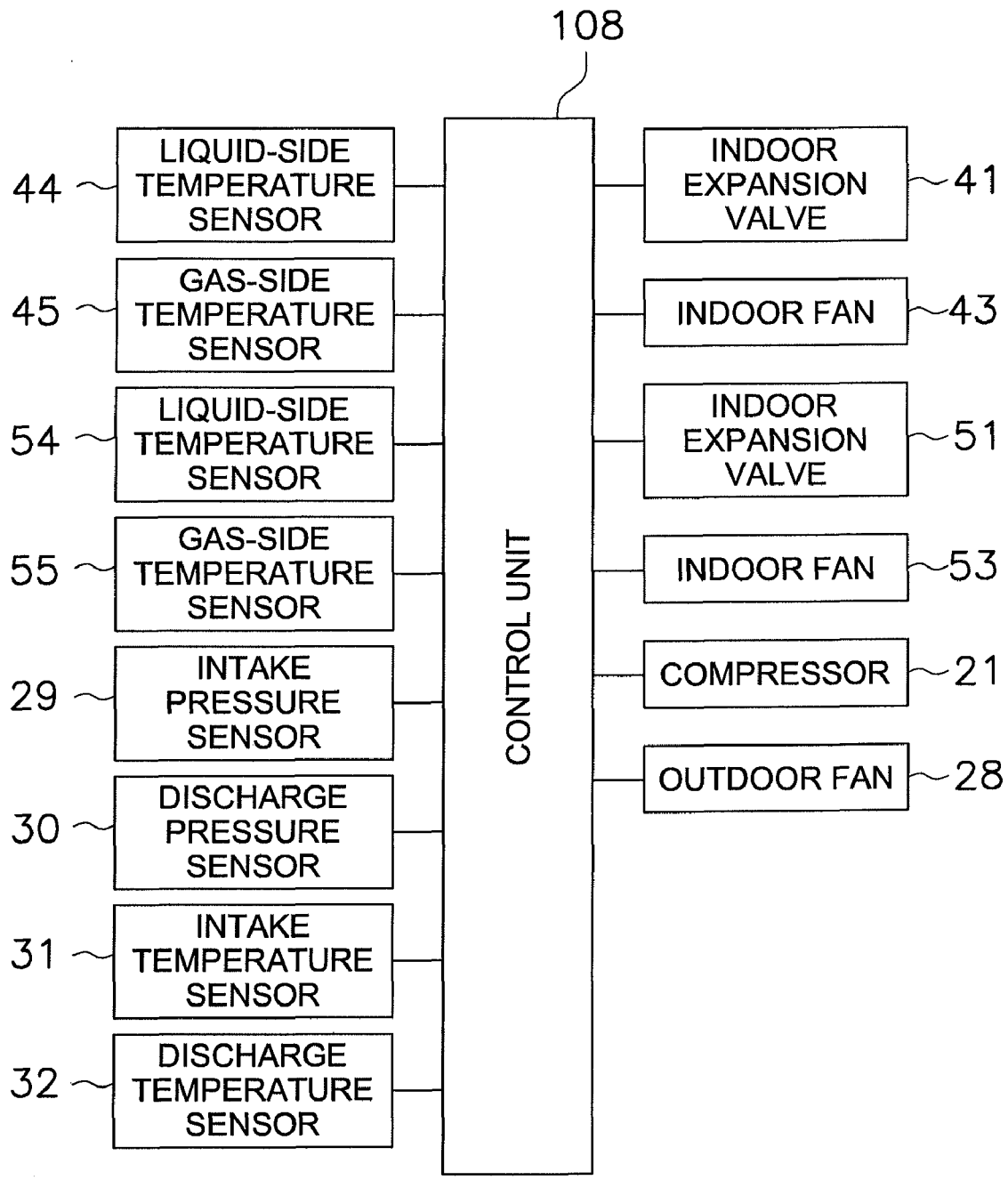
FIG. 6 is a control block diagram of the air conditioning apparatus according to the second embodiment of the present invention.

The control unit 108 is connected so as to be capable of receiving sensor signals from the various sensors 29 through 32, 44, 45, 54, and 55, and is also connected to be capable of controlling the various devices and valves 21, 28, 41, 43, 51, and 53 on the basis of these sensor signals and the like, as shown in FIG. 6. FIG. 6 is a control block diagram of the air conditioning apparatus 101 according to the present embodiment.

(Refrigerant Communication Pipes)

The refrigerant communication pipes 6, 7 are refrigerant pipes that are plumbed on the site when the air conditioning apparatus 101 is mounted in a building or other mounting site.

As described above, the indoor-side refrigerant circuits 10b, 10c, the outdoor-side refrigerant circuit 10a, and the refrigerant communication pipes 6, 7 are connected to form the refrigerant circuit 110 of the air conditioning apparatus 101. The air conditioning apparatus 101 of the present embodiment is designed so that the control unit 108 configured from the indoor-side control units 47, 57 and outdoor-side control unit 37 controls the devices of the outdoor unit 2 and the indoor units 4, 5 in accordance with the indoor temperature settings and other conditions, while performing a refrigeration cycle such as cooling or dehumidification in which the outdoor heat exchanger 23 is made to function as a refrigerant condenser and the indoor heat exchangers 42, 52 are made to function as refrigerant evaporators.

(2) Operation of Air Conditioning Apparatus

Next, the operation of the air conditioning apparatus 101 of the present embodiment will be described.

(Cooling Operation/Dehumidifying Operation)

The operation of the air conditioning apparatus 101 during cooling or dehumidifying is similar to the first embodiment in terms of the essential operation, except that since the indoor unit 5 is included in addition to the indoor unit 4, there are also cases in which both the indoor unit 4 and the indoor unit 5 are operating, and cases in which only one of either the indoor unit 4 or indoor unit 5 is operating. The operation is therefore not described herein.

(Superheat Degree Control)

In a refrigeration cycle in which the outdoor heat exchanger 23 is made to function as a refrigerant condenser and the indoor heat exchangers 42, 52 are made to function as refrigerant evaporators, superheat degree control is performed in which the apertures MV of the indoor expansion valves 41, 51 are controlled so that the degree of superheat SHr of the refrigerant is kept constant at the target degree of superheat SHrs at the outlet from the indoor heat exchangers 42, 52 (i.e., in the gas side of the indoor heat exchangers 42, 52) that function as refrigerant evaporators. Next, the superheat degree control by the indoor expansion valves 41, 51 will be described using FIG. 3, similar to the superheat degree control in the first embodiment. FIG. 3 is a flowchart showing the specifics of the superheat degree control of the present embodiment. In the following description, a case is described in which both the indoor unit 4 and the indoor unit 5 are operated. Cases in which only one of either the indoor unit 4 or indoor unit 5 is operated essentially involve only one indoor expansion valve being the target of control, and are therefore not described except for cases of special mention.

First, when it is determined in step S1 that the operation of the air conditioning apparatus 101 has been initiated by an operation command or the like from the remote controller, in step S2, lower aperture limits of the indoor expansion valves 41, 51 for superheat degree control by the indoor expansion valves 41, 51 are set to an initial value MV0. The purpose of setting the lower aperture limits of the indoor expansion valves 41, 51 is to prevent the indoor expansion valves 41, 51 from fully closing during superheat degree control in cases in which there is a large pressure difference before and behind the indoor expansion valves 41, 51, such as in cases in which there is an extremely large height difference H between the mounting positions of the outdoor unit 2 and the indoor units 4, 5, or cases in which the height difference H between the mounting positions of the outdoor unit 2 and the indoor units 4, 5 is moderately high but the condensation pressure is comparatively high due to conditions in the heat source of the outdoor heat exchanger 23. The term "lower aperture limit" refers to apertures of the indoor expansion valves 41, 51 larger than 0%, if the fully closed aperture is expressed as 0% and the fully open aperture is expressed as 100%, wherein the aperture range in which the indoor expansion valves 41, 51 can be moved is limited to this aperture or greater.

Next, in step S3, superheat degree control is initiated, wherein the apertures MV of the indoor expansion valves 41, 51 are controlled so that the degree of superheat SHr of the refrigerant at the outlets from the indoor heat exchangers 42, 52 is kept constant at a preset target degree of superheat SHrs. The indoor expansion valves 41, 51 are in a state in which the lower aperture limits are limited to the initial value MV0, and the apertures MV of the indoor expansion valves 41, 51 can therefore be varied between MV0 and the fully open aperture so that the degree of superheat SHr of the refrigerant at the outlets from the indoor heat exchangers 42, 52 is kept constant at the target degree of superheat SHrs. The degree of superheat SHr of the refrigerant at the outlets from the indoor heat exchangers 42, 52 is obtained by subtracting the refrigerant temperature Ti sensed by the liquid-side temperature sensors 44, 54 from the refrigerant temperature To sensed by the gas-side temperature sensors 45, 55. Though not used in the present embodiment, another possibility is to obtain the degree of superheat SHr of the refrigerant at the outlets from the indoor heat exchangers 42, 52 by providing a temperature sensor for sensing the temperature of the refrigerant flowing through the indoor heat exchangers 42, 52, and subtracting the refrigerant temperature sensed by this temperature sensor from the refrigerant temperature To sensed by the gas-side temperature sensors 45, 55.

Next, in step S4, a determination is made as to whether or not the refrigerant at the outlets from the indoor heat exchangers 42, 52 is wet. In the present embodiment, the determination of whether or not the refrigerant at the outlets from the indoor heat exchangers 42, 52 is wet is made based on the degree of superheat SHi of the refrigerant on the intake side of the compressor 21. Specifically, in cases in which the refrigerant at the outlets from the indoor heat exchangers 42, 52 is wet, the refrigerant on the intake side of the compressor 21 located downstream of the indoor heat exchangers 42, 52 is also in a nearly wet state, and this phenomenon is therefore used to determine whether or not the refrigerant at the outlets from the indoor heat exchangers 42, 52 is wet. More specifically, the refrigerant at the outlets from the indoor heat exchangers 42, 52 is determined to be wet in cases in which the degree of superheat SHi of the refrigerant on the intake side of the compressor 21 is smaller than a specific value (for example, in cases in which the degree of superheat SHi is equal to or less than 0 degrees). The degree of superheat SHi of the refrigerant on the intake side of the compressor 21 used in the determination of whether or not the refrigerant at the outlets from the indoor heat exchangers 42, 52 is wet is obtained by converting the intake pressure Ps sensed by the intake pressure sensor 29 to a saturation temperature of the refrigerant, and subtracting this saturation temperature from the intake temperature Ts sensed by the intake temperature sensor 31. Since the indoor unit 4 and the indoor unit 5 are mounted in positions at the same height in the present embodiment, it is assumed that the refrigerant at the outlet from the indoor heat exchanger 52 will often also be wet in cases in which the refrigerant at the outlet from the indoor heat exchanger 42 is wet.

In step S4, when it is determined that the refrigerant at the outlets from the indoor heat exchangers 42, 52 is not wet, it can be determined that the condition of the height difference H allows the degree of superheat SHr to be kept constant at the target degree of superheat SHrs even if the lower aperture limits of the indoor expansion valves 41, 51 are set to the initial value MV0. Therefore, in steps S6 and S7, until the operation of the air conditioning apparatus 101 is ended by an operation end command or the like from the remote controller, superheat degree control by the indoor expansion valves 41, 51 is performed in a state in which the lower aperture limits of the indoor expansion valves 41, 51 are set to the initial value MV0.

When it is determined in step S4 that the refrigerant at the outlets from the indoor heat exchangers 42, 52 is wet, in step S5, the setting of the lower aperture limits of the indoor expansion valves 41, 51 is changed from the initial value MV0 to MV1 which is smaller than the initial value MV0. The reason for reducing the lower aperture limits of the indoor expansion valves 41, 51 is that when the pressure difference before and behind the indoor expansion valves 41, 51 is too large and the lower aperture limits are left at the initial value MV0, an amount of refrigerant in excess of the performance required in the indoor units 4, 5 flows through the indoor heat exchangers 42, 52, and it becomes difficult to keep the degree of superheat SHr constant at the target degree of superheat SHrs (specifically, the degree of superheat SHr becomes less than the target degree of superheat SHrs). Thus, in step S5, reducing the lower aperture limits of the indoor expansion valves 41, 51 makes it possible to prevent the indoor expansion valves 41, 51 from fully closing while allowing the indoor expansion valves 41, 51 to move within a range of small apertures MV, and also makes it possible to keep the degree of superheat SHr constant at the target degree of superheat SHrs. Therefore, in steps S6 and S7, superheat degree control is performed using the indoor expansion valves 41, 51 in a state in which the lower aperture limits of the indoor expansion valves 41, 51 are set to MV1, which is less than the initial value MV0, until the operation of the air conditioning apparatus 101 is ended by an operation end command or the like from the remote controller.

In step S5, when the lower aperture limits are changed from the initial value MV0 to MV1, lower aperture limits of the indoor expansion valves 41, 51 suitable for the condition of the height difference H may be stored by substituting MV1 for the initial value MV0 or by another such method. When the air conditioning apparatus 101 is operated again, lower aperture limits of the indoor expansion valves 41, 51 suitable for the condition of the height difference H are thereby initially set in step S2.

Operation control for the air conditioning apparatus 101, including the superheat degree control described above, is performed by the control unit 108 acting as the operation control section or means.

(3) Characteristics of Air Conditioning Apparatus

Unlike the air conditioning apparatus 1 of the first embodiment, the air conditioning apparatus 101 of the present embodiment is a so-called multi-type air conditioning apparatus in which a plurality of (two in this case) indoor units 4, 5 is connected to the outdoor unit 2, but since both the indoor units 4, 5 are mounted at the same height, the same problems encountered with superheat degree control by an indoor expansion valve in the air conditioning apparatus 1 of the first embodiment arise from a large height difference H between the mounting positions of the outdoor unit 2 and the indoor units 4, 5 and the like. Therefore, similar to the air conditioning apparatus 1 of the first embodiment, it is possible in the air conditioning apparatus 101 of the present embodiment to satisfactorily control the degree of superheat SHr of the refrigerant at the outlets from the indoor heat exchangers 42, 52 functioning as refrigerant evaporators in cases such as when there is a large height difference H between the mounting positions of the outdoor unit 2 and the indoor units 4, 5 and the like.

(4) Modification 1

In the present embodiment described above, the indoor unit 4 and the indoor unit 5 are mounted at positions of the same height, and problems in terms of superheat degree control are encountered as a result of a large height difference H between the mounting positions of the outdoor unit 2 and the indoor units 4, 5 and the like. However, unlike this case, even in cases in which there is a height difference H between the mounting positions of a plurality of indoor units (the indoor units 4, 5 in this case), there may be cases in which the pressure difference before and behind the indoor expansion valve of the lower mounted indoor unit (the indoor expansion valve 51 of the indoor unit 5 herein) is greater than that of the indoor expansion valve of the upper mounted indoor unit (the indoor expansion valve 41 of the indoor unit 4 herein); also cases in which the pressure difference before and behind the indoor expansion valves (the indoor expansion valves 41, 51 of the indoor units 4, 5 herein) is only moderately high but the indoor expansion valve (the indoor expansion valve 41 herein) of the higher indoor unit (the indoor unit 4 herein) of the plurality of indoor units (the indoor units 4, 5 herein) is kept at a comparatively small aperture, or cases in which the aperture of the indoor expansion valve (the indoor expansion valve 51 herein) of the lower mounted indoor unit (the indoor unit 5 herein) is extremely small due to the relationship with the aperture of the higher mounted indoor expansion valve (the indoor expansion valve 41 herein). In such cases, superheat degree control is performed in a state in which the aperture of the indoor expansion valve of the lower mounted indoor unit of the plurality of indoor units is extremely small, and the same problems occur as those caused by a large height difference H between the mounting positions of the outdoor unit 2 and the indoor units 4, 5 and the like. Therefore, superheat degree control by indoor expansion valves is performed in the same manner as in the embodiment described above even in cases in which there is a height difference H between the mounting positions of the indoor units.

Figure 7:
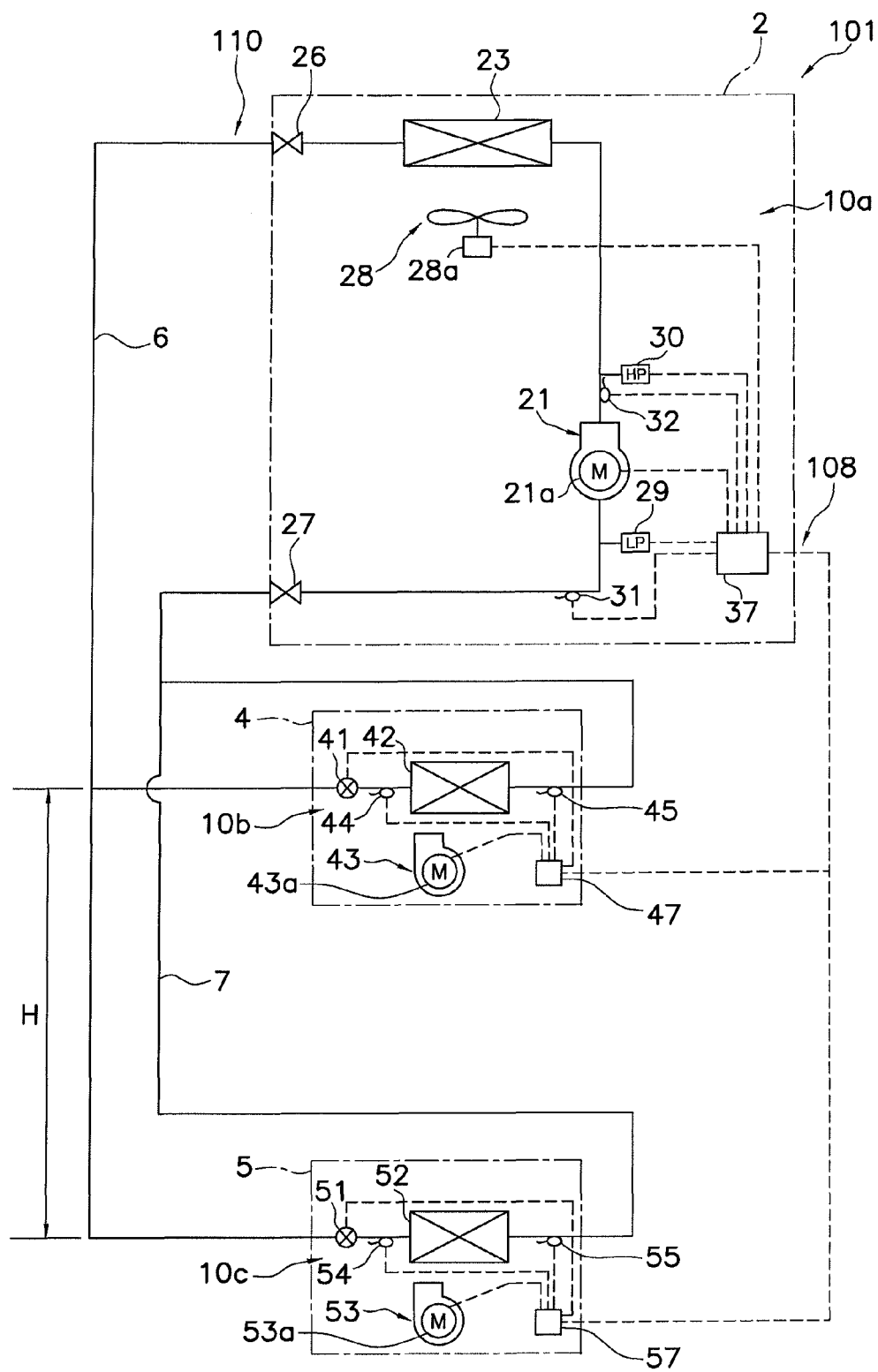
FIG. 7 is a schematic structural diagram of the air conditioning apparatus according to modification 1 of the second embodiment of the present invention.
Figure 8:
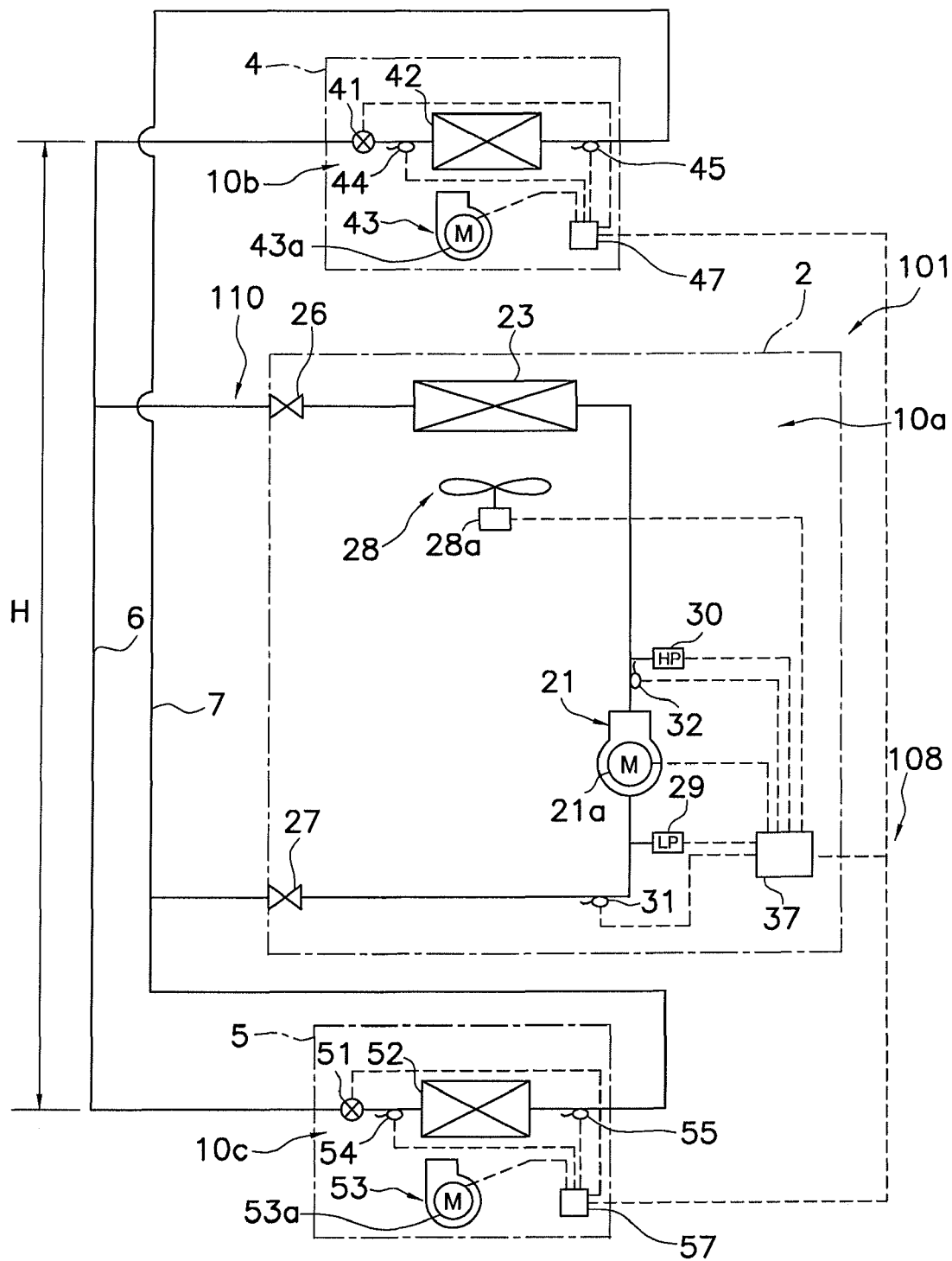
FIG. 8 is a schematic structural diagram of the air conditioning apparatus according to modification 1 of the second embodiment of the present invention.
Figure 9:
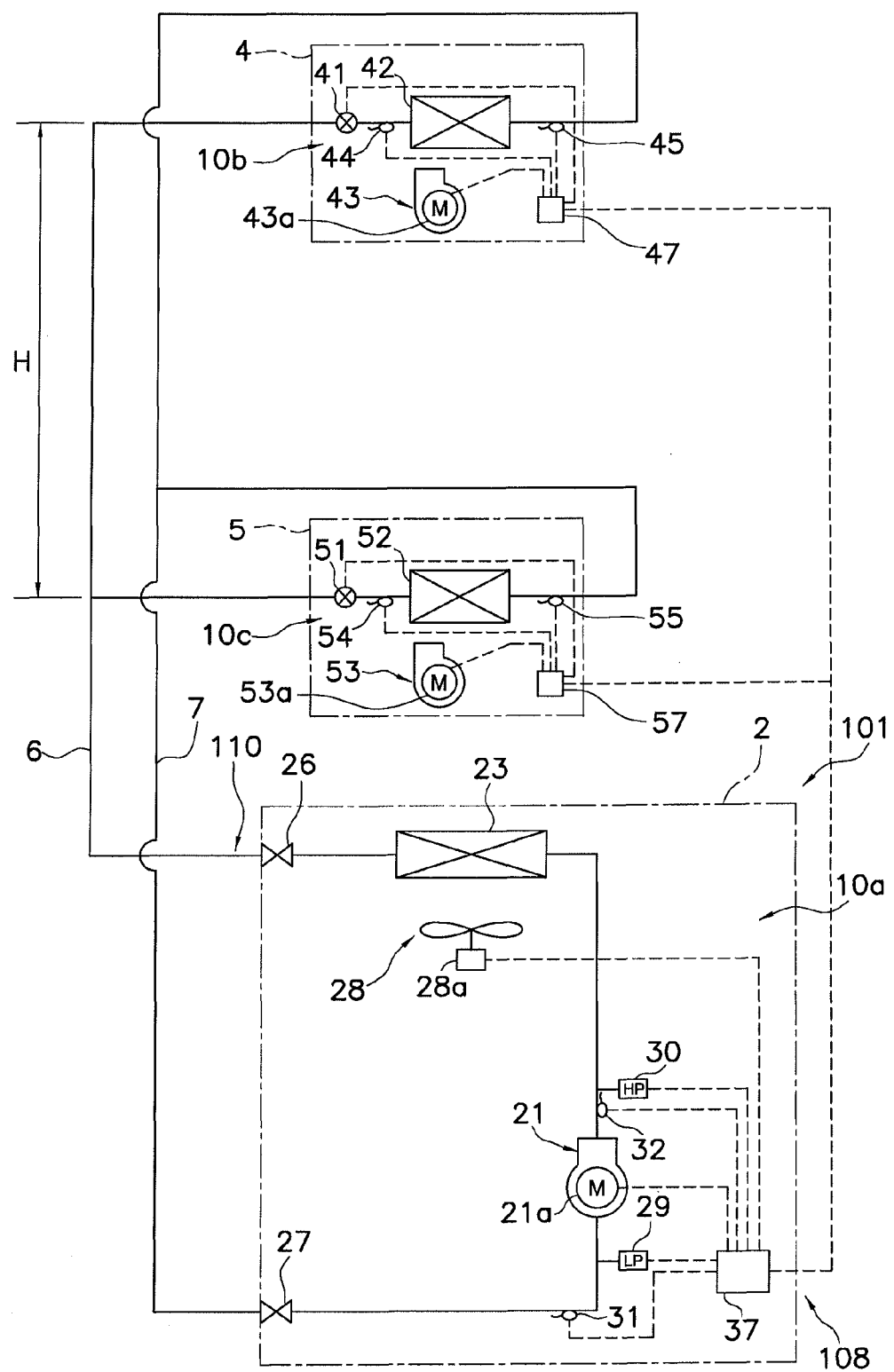
FIG. 9 is a schematic structural diagram of the air conditioning apparatus according to modification 1 of the second embodiment of the present invention.

Thus, specific examples of cases in which there is a height difference H between the mounting positions of the indoor units are a case such as the one shown in FIG. 7 in which the indoor unit 4 is mounted below the outdoor unit 2 and the indoor unit 5 is mounted even further below the outdoor unit 2 (the height different between the indoor unit 4 and the indoor unit 5 is referred to as H), a case such as the one shown in FIG. 8 in which the indoor unit 4 is mounted above the outdoor unit 2 and the indoor unit 5 is mounted below the outdoor unit 2 (the height difference between the indoor unit 4 and the indoor unit 5 is referred to as H), and a case such as the one shown in FIG. 9 in which both the indoor units 4, 5 are mounted at higher positions than the outdoor unit 2 and the indoor unit 4 is mounted at a higher position than the indoor unit 5 (the height difference between the indoor unit 4 and the indoor unit 5 is referred to as H).

Next, FIG. 3 will be used to describe superheat degree control by the use of indoor expansion valves in a case in which there is a height difference H between the mounting positions of the indoor units.

First, when it is determined in step S1 that the operation of the air conditioning apparatus 101 has been initiated by an operation command or the like from the remote controller, in step S2, lower aperture limits of the indoor expansion valves 41, 51 for superheat degree control by the indoor expansion valves 41, 51 are set to an initial value MV0. The purpose of setting the lower aperture limits of the indoor expansion valves 41, 51 is to prevent the indoor expansion valve 51 from fully closing during superheat degree control in cases in which there is a large height difference H between the mounting positions of the indoor units 4, 5, and the pressure difference in the lower mounted indoor expansion valve 51 is greater than the pressure difference before and behind the indoor expansion valve 41, or in cases in which the aperture of the indoor expansion valve 51 of the lower mounted indoor unit 5 is extremely small due to the relationship with the aperture of the indoor expansion valve 41 of the higher mounted indoor unit 4.

Next, in step S3, superheat degree control is initiated to control the apertures MV of the indoor expansion valves 41, 51 so that the degree of superheat SHr of the refrigerant at the outlets from the indoor heat exchangers 42, 52 is kept constant at the preset target degree of superheat SHrs.

Next, in step S4, a determination is made as to whether or not the refrigerant at the outlets from the indoor heat exchangers 42, 52 is wet. In the present modification, similar to the embodiment described above, the determination of whether or not the refrigerant at the outlets from the indoor heat exchangers 42, 52 is wet is made based on the degree of superheat SHi of the refrigerant on the intake side of the compressor 21. Specifically, in cases in which the refrigerant at the outlets from the indoor heat exchangers 42, 52 is wet, the refrigerant on the intake side of the compressor 21 located downstream of the indoor heat exchangers 42, 52 is also in a nearly wet state, and this phenomenon is therefore used to determine whether or not the refrigerant at the outlets from the indoor heat exchangers 42, 52 is wet. More specifically, the refrigerant at the outlets from the indoor heat exchangers 42, 52 is determined to be wet in cases in which the degree of superheat SHi of the refrigerant on the intake side of the compressor 21 is smaller than a specific value (for example, in cases in which the degree of superheat SHi is equal to or less than 0 degrees). The degree of superheat SHi of the refrigerant on the intake side of the compressor 21 used in the determination of whether or not the refrigerant at the outlets from the indoor heat exchangers 42, 52 is wet is obtained by converting the intake pressure Ps sensed by the intake pressure sensor 29 to a saturation temperature of the refrigerant, and subtracting this saturation temperature from the intake temperature Ts sensed by the intake temperature sensor 31. Since the indoor unit 5 is mounted lower than the indoor unit 4 in the present modification, it is also substantially determined whether or not the refrigerant at the outlet from the indoor heat exchanger 52 is wet.

In step S4, when it is determined that the refrigerant at the outlets from the indoor heat exchangers 42, 52 is not wet, it can be determined that the condition of the height difference H allows the degree of superheat SHr to be kept constant at the target degree of superheat SHrs even if the lower aperture limits of the indoor expansion valves 41, 51 are set to the initial value MV0. Therefore, in steps S6 and S7, until the operation of the air conditioning apparatus 101 is ended by an operation end command or the like from the remote controller, superheat degree control by the indoor expansion valves 41, 51 is performed in a state in which the lower aperture limits of the indoor expansion valves 41, 51 are set to the initial value MV0.

When it is determined in step S4 that the refrigerant at the outlets from the indoor heat exchangers 42, 52 is wet, in step S5, the setting of the lower aperture limits of the indoor expansion valves 41, 51 is changed from the initial value MV0 to MV1 which is smaller than the initial value MV0. The reason for reducing the lower aperture limits of the indoor expansion valves 41, 51 is that regardless of whether or not the pressure difference before and behind the indoor expansion valve 51 is too large, and also regardless of whether or not the aperture of the indoor expansion valve 51 of the lower mounted indoor unit 5 tends to be small relative to the aperture of the indoor expansion valve 41 of the higher mounted indoor unit 4, when the lower aperture limit is left at the initial value MV0, an amount of refrigerant in excess of the performance required in the indoor unit 5 flows through the indoor heat exchanger 52, and it becomes difficult to keep the degree of superheat SHr constant at the target degree of superheat SHrs (specifically, the degree of superheat SHr becomes less than the target degree of superheat SHrs). Thus, in step S5, reducing the lower aperture limits of the indoor expansion valves 41, 51 makes it possible to prevent the indoor expansion valve 51 from fully closing while allowing the indoor expansion valve 51 to move within a range of small apertures MV, and also makes it possible to keep the degree of superheat SHr constant at the target degree of superheat SHrs. Therefore, in steps S6 and S7, superheat degree control is performed using the indoor expansion valves 41, 51 in a state in which the lower aperture limits of the indoor expansion valves 41, 51 are set to MV1, which is less than the initial value MV0, until the operation of the air conditioning apparatus 101 is ended by an operation end command or the like from the remote controller.

In step S5, when the lower aperture limits are changed from the initial value MV0 to MV1, lower aperture limits of the indoor expansion valves 41, 51 suitable for the condition of the height difference H may be stored by substituting MV1 for the initial value MV0 or by another such method. When the air conditioning apparatus 101 is operated again, lower aperture limits of the indoor expansion valves 41, 51 suitable for the condition of the height difference H are thereby initially set in step S2.

In the present modification, similar to the embodiment described above, the air conditioning apparatus is a so-called multi-type air conditioning apparatus, but since a height difference H exists between the mounting positions of the plurality of indoor units (the indoor units 4, 5 herein), there are slight differences in terms of the superheat degree control by the indoor expansion valves. Specifically, in the air conditioning apparatus 101 of the present modification, in cases in which there is a considerable pressure difference before and behind the indoor expansion valve of the lower mounted indoor unit (the indoor expansion valve 51 of the indoor unit 5 herein), it is possible to prevent the lower mounted indoor expansion valve 51 from fully closing. Moreover, reducing the lower aperture limit when the refrigerant at the outlet from the lower mounted indoor heat exchanger 52 is detected to be wet makes it possible to allow the indoor expansion valve 51 to further move to a range of small apertures MV while preventing the indoor expansion valve 51 from fully closing. It is therefore possible to satisfactorily control the degree of superheat SHr of the refrigerant at the outlet from the indoor heat exchanger 52 even in cases in which the pressure difference before and behind the lower mounted indoor expansion valve 51 is too great, e.g., an amount of refrigerant in excess of the performance required in the lower mounted indoor unit 5 flows through the indoor heat exchanger 52 at the initially set lower aperture limit (the initial value MV0 in the present embodiment), and it is difficult to keep constant the degree of superheat SHr of the refrigerant at the outlet from the indoor heat exchanger 52 that functions as an evaporator.

(5) Modification 2

In the present embodiment and modification 1 described above, in cases in which it is determined in step S4 (see FIG. 3) of superheat degree control that the refrigerant at the outlet from the indoor heat exchanger 42 is wet, the setting of the lower aperture limits of the indoor expansion valves 41, 51 is changed only once from the initial value MV0 to MV1, which is less than MV0. Similar to modification 1 of the first embodiment, another possibility, as shown in FIG. 4, is to change the setting in step S5 so that the lower aperture limits of the indoor expansion valves 41, 51 decrease intermittently from the initial value MV0 (e.g., MV0→MV1→MV2→ . . . etc.), until it is no longer determined in step S4 that the refrigerant at the outlets from the indoor heat exchangers 42, 52 is wet.

(6) Modification 3

In the present embodiment and modifications 1 and 2 described above, it is detected in step S4 (see FIG. 3 or 4) of superheat degree control whether or not the refrigerant at the outlets from the indoor heat exchangers 42, 52 is wet on the basis of the degree of superheat SHi of the refrigerant on the intake side of the compressor 21, but as in modification 2 of the first embodiment, another possibility is to sense whether or not the refrigerant at the outlets from the indoor heat exchangers 42, 52 is wet on the basis of the degree of superheat SHo of the refrigerant on the discharge side of the compressor 21, instead of the degree of superheat SHi.

As in modification 2 of the first embodiment, another possibility is to use both the degree of superheat SHi and the degree of superheat SHo to determine whether or not the refrigerant at the outlets from the indoor heat exchangers 42, 52 is wet.

(7) Modification 4

In step S4 (see FIG. 3 or 4) of superheat degree control in the present embodiment and modifications 1 and 2 described above, it is detected whether or not the refrigerant at the outlets from the indoor heat exchangers 42, 52 is wet on the basis of the degree of superheat SHi of the refrigerant on the intake side of the compressor 21, but, as in modification 3 of the first embodiment, another possibility is to detect whether or not the refrigerant at the outlets from the indoor heat exchangers 42, 52 is wet on the basis of the degree of superheat SHr of the refrigerant at the outlets from the indoor heat exchangers 42, 52 instead of the degree of superheat SHi.

In cases in which a plurality of indoor units (two indoor units 4, 5 herein) is mounted, as in the present embodiment and modifications 1 and 2, another option is to reduce the lower aperture limit only for the indoor expansion valve of the indoor unit in which the refrigerant at the outlet from the indoor heat exchanger is detected to be wet. In the present embodiment and modifications 1 and 2, it is assumed that the refrigerant is wet at the outlet from the indoor heat exchanger 52 of the indoor unit 5, which is mounted lower than the indoor unit 4, but in cases such as in the present modification in which it is detected whether of not the refrigerant at the outlets from the indoor heat exchangers 42, 52 is wet on the basis of the degree of superheat SHr of the refrigerant at the outlets from the indoor heat exchangers 42, 52, it is possible to specify that only the refrigerant at the outlet from the indoor heat exchanger 52 of the indoor unit 5 is wet. It is therefore also possible, for example, to reduce the lower aperture limit only for the indoor expansion valve 51 of the indoor unit 5 without changing the lower aperture limit for the indoor expansion valve 41 of the indoor unit 4.

As in modification 3 of the first embodiment, another possibility is to use both the degree of superheat SHi and the degree of superheat SHr to determine whether or not the refrigerant at the outlets from the indoor heat exchangers 42, 52 is wet. For example, in cases in which the protection of the compressor 21 is emphasized, the refrigerant at the outlets from the indoor heat exchangers 42, 52 may be determined to be wet when either one of the degree of superheat SHi or degree of superheat SHr falls to a specific value or less. In cases in which the ease of controlling the degree of superheat in the indoor expansion valves 41, 51 is emphasized, the refrigerant at the outlets from the indoor heat exchangers 42, 52 may be determined to be wet when both the degree of superheat SHi and degree of superheat SHr fall to a specific value or less. In cases in which the degree of superheat SHi is also used, another option is to reduce the lower aperture limit only for the indoor expansion valve of the indoor unit for which it is specified that only the refrigerant at the outlet from the indoor heat exchanger is wet, similar to the above description. This is because the indoor expansion valve whose lower aperture limit is to be changed can be specified based on the degree of superheat SHr.

In modification 3 described above, it is detected whether or not the refrigerant at the outlet from the indoor heat exchanger 42 is wet on the basis of the degree of superheat SHo of the refrigerant on the discharge side of the compressor 21, but another possibility is to determine whether or not the refrigerant at the outlet from the indoor heat exchanger 42 is wet by additionally using the degree of superheat SHr, or by using both the degree of superheat SHi and the degree of superheat SHr. In cases in which the degree of superheat SHo is also used, another option is to reduce the lower aperture limit only for the indoor expansion valve of the indoor unit in which it is specified that only the refrigerant at the outlet from the indoor heat exchanger is wet, similar to the above description. This is because the indoor expansion valve whose lower aperture limit is to be changed can be specified based on the degree of superheat SHr.

(8) Modification 5

In the present embodiment and modifications 1 and 2 described above, in step S4 (see FIG. 3 or 4) of superheat degree control, it is detected whether or not the refrigerant at the outlet from the indoor heat exchanger 42 is wet on the basis of the degree of superheat SHi of the refrigerant on the intake side of the compressor 21, but another option is to detect whether or not the refrigerant at the outlets from the indoor heat exchangers 42, 52 is wet on the basis of the apertures MV of the indoor expansion valves 41, 51, instead of the degree of superheat SHi, as in modification 4 of the first embodiment.

In cases in which a plurality of indoor units (two indoor units 4, 5 herein) is mounted, as in the present embodiment and modifications 1 and 2, another option is to reduce the lower aperture limit only for the indoor expansion valve of the indoor unit for which the refrigerant at the outlet from the indoor heat exchanger is detected to be wet. In the present embodiment and modifications 1 and 2, it is assumed that the refrigerant is wet at the outlet from the indoor heat exchanger 52 of the indoor unit 5, which is mounted lower than the indoor unit 4, but in cases such as in the present modification in which it is detected whether or not the refrigerant at the outlets from the indoor heat exchangers 42, 52 is wet on the basis of the apertures MV of the indoor expansion valves 41, 51, it is possible to specify that only the refrigerant at the outlet from the indoor heat exchanger 52 of the indoor unit 5 is wet. It is therefore also possible, for example, to reduce the lower aperture limit only for the indoor expansion valve 51 of the indoor unit 5 without changing the lower aperture limit for the indoor expansion valve 41 of the indoor unit 4.

As in modification 4 of the first embodiment, another possibility is to use both the degree of superheat SHi and the apertures MV to determine whether or not the refrigerant at the outlets from the indoor heat exchangers 42, 52 is wet. For example, in cases in which the protection of the compressor 21 is emphasized, the refrigerant at the outlets from the indoor heat exchangers 42, 52 may be determined to be wet when either one of the degree of superheat SHi or the apertures MV falls to a specific value or less. In cases in which the ease of controlling the degree of superheat in the indoor expansion valves 41, 51 is emphasized, the refrigerant at the outlets from the indoor heat exchangers 42, 52 may be determined to be wet when both the degree of superheat SHi and the apertures MV fall to a specific value or less. In cases in which the degree of superheat SHi is also used, another option is to reduce the lower aperture limit only for the indoor expansion valve of the indoor unit in which it is specified that only the refrigerant at the outlet from the indoor heat exchanger is wet, similar to the above description. This is because the indoor expansion valve whose lower aperture limit is to be changed can be specified based on the apertures MV.

In modification 3 described above, it is detected whether or not the refrigerant at the outlets from the indoor heat exchangers 42, 52 is wet on the basis of the degree of superheat SHo of the refrigerant on the discharge side of the compressor 21, but another possibility is to determine whether or not the refrigerant at the outlets from the indoor heat exchangers 42, 52 is wet by additionally using the apertures MV, or by using both the degree of superheat SHi and the apertures MV. In cases in which the degree of superheat SHo is also used, another option is to reduce the lower aperture limit only for the indoor expansion valve of the indoor unit in which it is specified that only the refrigerant at the outlet from the indoor heat exchanger is wet, similar to the above description. This is because the indoor expansion valve whose lower aperture limit is to be changed can be specified based on the apertures MV.

In modification 4 described above, it is detected whether or not the refrigerant at the outlets from the indoor heat exchangers 42, 52 is wet on the basis of the degree of superheat SHr of the refrigerant at the outlet from the indoor heat exchanger 42, but another possibility is to determine whether or not the refrigerant at the outlets from the indoor heat exchangers 42, 52 is wet by additionally using the apertures MV, using both the degree of superheat SHi and the apertures MV, using both the degree of superheat SHo and the apertures MV, or using the degree of superheat SHi, the degree of superheat SHo, and the apertures MV all together. Thus, in cases in which the degree of superheat SHr is also used, another option is to reduce the lower aperture limit only for the indoor expansion valve of the indoor unit in which it is specified that only the refrigerant at the outlet from the indoor heat exchanger is wet, similar to the above description. This is because the indoor expansion valve whose lower aperture limit is to be changed can be specified based on the apertures MV.

Other Embodiments

Embodiments of the present invention were described above based on the drawings, but the specific configuration is not limited to these embodiments, and modifications can be made within a range that does not deviate from the scope of the invention.

For example, in the embodiments and modifications described above, examples were described in which the present invention was applied to a so-called dedicated cooling air conditioning apparatus capable of performing a refrigeration cycle such as cooling or dehumidifying in which an outdoor heat exchanger is made to function as a refrigerant condenser, and indoor heat exchangers are made to function as refrigerant evaporators. However, the present invention is not limited to this option alone, and may also be applied to an air conditioning apparatus capable of switching between a cooling operation and a heating operation, or an air conditioning apparatus capable of simultaneously performing a cooling operation and a heating operation.

INDUSTRIAL APPLICABILITY

If the present invention is used in a separated-type air conditioning apparatus in which the degree of superheat at an outlet from an indoor heat exchanger functioning as an evaporator is controlled by an expansion valve, the degree of superheat of the refrigerant at the outlet from the indoor heat exchanger functioning as an evaporator can be satisfactorily controlled even in cases in which there is a large height difference between the mounting positions of the outdoor unit and the indoor unit, or in cases in which a plurality of indoor units is mounted and there is a height difference between the mounting positions of the indoor units.

What is claimed is:

1. An air conditioning apparatus comprising:
a refrigerant circuit including an outdoor unit and an indoor unit connected to the outdoor unit, the outdoor unit having a compressor and an outdoor heat exchanger, and the indoor unit having an expansion valve and an indoor heat exchanger with an outlet; and
an operation control section configured to control the refrigerant circuit such that the outdoor heat exchanger operates as a refrigerant condenser and the indoor heat exchanger operates as a refrigerant evaporator while performing superheat degree control, an aperture of the expansion valve being controlled so that the degree of superheat of refrigerant at the outlet from the indoor heat exchanger is constant when superheat degree control is performed,
the operation control section setting a lower aperture limit for the expansion valve in order to perform the superheat degree control, and the operation control section reducing the lower aperture limit when refrigerant at the outlet from the indoor heat exchanger is detected to be wet.

2. The air conditioning apparatus as recited in claim 1, wherein
the operation control section is configured to detect whether or not the refrigerant at the outlet from the indoor heat exchanger is wet based on the degree of superheat of the refrigerant on an intake side of the compressor.

3. The air conditioning apparatus as recited in claim 1, wherein
the operation control section is configured to detect whether or not the refrigerant at the outlet from the indoor heat exchanger is wet based on the degree of superheat of the refrigerant on a discharge side of the compressor.

4. The air conditioning apparatus as recited in claim 1, wherein the operation control section is configured to detect whether or not the refrigerant at the outlet from the indoor heat exchanger is wet based on the degree of superheat of the refrigerant at the outlet from the indoor heat exchanger.

5. The air conditioning apparatus as recited in claim 1, wherein the operation control section is configured to detect whether or not the refrigerant at the outlet from the indoor heat exchanger is wet based on the aperture of the expansion valve.

* * * * *